(12) United States Patent
Eckstein et al.

(10) Patent No.: US 6,270,867 B1
(45) Date of Patent: Aug. 7, 2001

(54) STRUCTURES OF POLYMERS MADE FROM SINGLE SITE CATALYSTS

(75) Inventors: John P. Eckstein, Neenah, WI (US); Johnny Q. Zheng, Peach Tree City, GA (US); Mark E. Nordness, Menomonee Falls, WI (US); Ronald J. Dembowski, Bethlehem, PA (US); Douglas J. Jackson, Wayne, NJ (US)

(73) Assignee: Pechiney Plastic Packaging, Inc., Chicago, IL (US)

( * ) Notice: Subject to any disclaimer, the term of this patent is extended or adjusted under 35 U.S.C. 154(b) by 0 days.

(21) Appl. No.: 09/144,713

(22) Filed: Sep. 1, 1998

Related U.S. Application Data (60) Continuation-in-part of application No. 08/488,151, filed on Jun. 7, 1995, now abandoned, which is a division of application No. 08/082,226, filed on Jun. 24, 1993, now abandoned.

(51) Int. Cl.[7] ................................................ B65D 35/10

(52) U.S. Cl. .................. 428/35.7; 428/36.91; 428/516; 156/369.1; 220/837; 222/92; 222/107; 215/44; 215/235

(58) Field of Search ............... 222/92, 107; 215/44, 215/235; 220/837; 428/516, 35.9, 35.7, 35.8, 35.4, 36.91; 525/240; 156/475

(56) References Cited

U.S. PATENT DOCUMENTS

| | | | |
|---|---|---|---|
| 4,257,536 | * 3/1981 | Hilmar | 222/107 |
| 4,261,482 | 4/1981 | Yamada et al. | 222/215 |
| 4,312,964 | 1/1982 | Sekine et al. | 525/88 |
| 4,336,212 | 6/1982 | Yoshimura et al. | 264/22 |
| 4,339,496 | 7/1982 | Weiner | 428/349 |

(List continued on next page.)

FOREIGN PATENT DOCUMENTS

| | | |
|---|---|---|
| 0 180 503 | 3/1984 | (EP) . |
| 0 451 977 | 10/1991 | (EP) . |
| 0 552 911 | 7/1993 | (EP) . |
| WO94/09060 | 4/1994 | (EP) . |
| 0 597 502 | 5/1994 | (EP) . |
| WO/95/04761 | 2/1995 | (EP) . |
| WO-A-94 06857 | 3/1994 | (WO) . |
| 94 09060 | 4/1994 | (WO) . |
| WO-A-94 07954 | 4/1994 | (WO) . |
| WO-A-94 18263 | 8/1994 | (WO) . |
| 95 04761 | 2/1995 | (WO) . |

OTHER PUBLICATIONS

Peterson *Metallo–Organic Chemistry*, Wiley and Sons, pp. 310–313, 1985.

(List continued on next page.)

*Primary Examiner*—Paul Thibodeau
*Assistant Examiner*—D. Lawrence Tarazano
(74) *Attorney, Agent, or Firm*—Ohlandt, Greeley, Ruggiero & Perle, L.L.P.

(57) ABSTRACT

Copolymers of ethylene and alpha olefins that have been formed by the polymerization reaction in the presence of a single site catalyst, such as a metallocene, are used to form collapsible dispensing containers and/or components thereof. Blends of the copolymers with propylene polymers are disclosed and used to form a body wall layer or a collapsible dispensing container head having good bond strength with a body wall layer formed of an ethylene polymer. Methods for improving the adhesion between collapsible dispensing container components, such as between body wall layer formed of an ethylene polymer and another body wall layer formed of a propylene polymer, or between a body wall layer formed of an ethylene polymer and a collapsible dispensing container head formed of a propylene polymer, are also disclosed.

65 Claims, 3 Drawing Sheets

U.S. PATENT DOCUMENTS

| | | | |
|---|---|---|---|
| 4,366,292 | 12/1982 | Werner et al. | 525/240 |
| 4,378,451 | 3/1983 | Edwards | 525/240 |
| 4,395,519 | 7/1983 | Minami et al. | 525/240 |
| 4,418,941 * | 12/1983 | Eckstein | 222/107 |
| 4,421,867 | 12/1983 | Nojiri et al. | 521/82 |
| 4,457,960 | 7/1984 | Newsome | 428/35 |
| 4,487,871 | 12/1984 | Ishibashi et al. | 524/100 |
| 4,499,241 | 2/1985 | Yoshimura et al. | 525/211 |
| 4,503,122 | 3/1985 | Schirmer | 428/349 |
| 4,525,257 | 6/1985 | Kurtz et al. | 204/159.2 |
| 4,591,253 | 5/1986 | Mueller | 428/34.2 |
| 4,634,739 | 1/1987 | Vasssilatos | 525/240 |
| 4,640,870 | 2/1987 | Akazawa et al. | 428/483 |
| 4,647,483 | 3/1987 | Tse et al. | 428/35 |
| 4,695,491 | 9/1987 | Kondo et al. | 428/35 |
| 4,726,984 | 2/1988 | Shah | 428/216 |
| 4,788,105 | 11/1988 | Mueller et al. | 428/412 |
| 4,863,769 | 9/1989 | Lusig et al. | 428/34.9 |
| 4,871,705 | 10/1989 | Hoel | 502/117 |
| 4,964,538 * | 10/1990 | Nimmey | 222/92 |
| 4,986,053 * | 1/1991 | Shaefer | 53/401 |
| 5,011,891 | 4/1991 | Spenadel et al. | 525/211 |
| 5,036,889 | 8/1991 | Pherigo | 138/89 |
| 5,073,420 | 12/1991 | Yano et al. | 428/35.7 |
| 5,089,321 | 2/1992 | Chum et al. | 428/218 |
| 5,126,408 | 6/1992 | Rifi | 525/240 |
| 5,135,800 | 8/1992 | Nagaoka et al. | 428/216 |
| 5,164,258 | 11/1992 | Shida et al. | 428/319.3 |
| 5,204,402 | 4/1993 | Funaki et al. | 526/336 |
| 5,206,075 | 4/1993 | Hodgson, Jr. | 428/216 |
| 5,221,017 | 6/1993 | Cistone et al. | 215/235 |
| 5,238,718 | 8/1993 | Yano et al. | 428/35.7 |
| 5,248,534 | 9/1993 | Rosen | 428/36.7 |
| 5,262,228 | 11/1993 | Kobyama et al. | 428/220 |
| 5,264,797 | 11/1993 | Stricklen | 502/111 |
| 5,272,236 | 12/1993 | Lai et al. | 526/348.5 |
| 5,278,272 | 1/1994 | Lai et al. | 526/348.5 |
| 5,280,074 | 1/1994 | Schreck et al. | 525/240 |
| 5,283,128 | 2/1994 | Wilhoit | 428/516 |
| 5,336,746 | 8/1994 | Tsutsui et al. | 526/348.6 |
| 5,358,792 | 10/1994 | Mehta et al. | 428/516 |
| 5,360,670 | 11/1994 | Yonezu et al. | 428/412 |
| 5,372,863 | 12/1994 | Nishikawa | 428/36.6 |
| 5,374,459 | 12/1994 | Mumpower et al. | 428/367 |
| 5,380,810 | 1/1995 | Lai et al. | 526/352 |
| 5,397,613 | 3/1995 | Georgelos | 428/36.7 |
| 5,397,640 | 3/1995 | Georgelos et al. | 428/349 |
| 5,409,991 | 4/1995 | Mitsuno et al. | 428/35.7 |
| 5,427,807 | 6/1995 | Chum et al. | 426/393 |
| 5,474,820 | 12/1995 | Murschall et al. | 428/35.7 |
| 5,516,563 | 5/1996 | Schumann et al. | 428/34.2 |
| 5,523,136 | 6/1996 | Fischer et al. | 428/35.2 |
| 5,525,695 | 6/1996 | Lai et al. | 526/352 |
| 5,539,066 | 7/1996 | Winter et al. | 526/119 |
| 5,556,678 | 9/1996 | Jupin et al. | 428/36.6 |
| 5,558,930 | 9/1996 | DiPoto | 428/216 |
| 5,560,948 | 10/1996 | Peiffer et al. | 426/127 |
| 5,560,997 | 10/1996 | Kotani et al. | 428/500 |
| 5,562,958 | 10/1996 | Walton et al. | 428/34.9 |
| 5,576,374 | 11/1996 | Betso et al. | 524/451 |
| 5,595,705 | 1/1997 | Walton et al. | 264/456 |
| 5,599,865 | 2/1997 | Koizumi et al. | 524/413 |
| 5,604,043 | 2/1997 | Ahlgren | 428/518 |
| 5,608,008 | 3/1997 | Miyata et al. | 525/240 |
| 5,614,315 | 3/1997 | Kondo et al. | 428/332 |
| 5,665,800 | 9/1997 | Lai et al. | 524/115 |
| 5,674,342 | 10/1997 | Obijeski et al. | |
| 5,677,383 | 10/1997 | Chum et al. | 525/240 |
| 5,685,128 | 11/1997 | Chum et al. | 53/441 |

OTHER PUBLICATIONS

Encyclopedia of Polymer Science and Engineering, *FILMS, Manufacture*. vol. 7. pp. 88–89, 1987.

Schut. Enter a New Generation of Polyolefins, Plastics Technology, pp. 15–17, Nov., 1991.

Childress, B.C., *Properties of Homogeneous and Heterogeneous Polyolefins*: . . . (May, 1994).

Lai, S. et al., Dow Rheology Index (DRI) for Insite Technology Polyolefins (ITP): . . . , ANTEC '94, pp. 1814–1815 (1994).

Chowdbury, Jayadev et al., Polymers by Blueprint, Chemical Engineering, vol. 100/No. 4, p. 34 (Apr. 1993).

Sinclair, K.B., New Polyolefins From Emerging Catalyst Technologies, Society of Plastics Engineers Polyolefins VIII Int'l. Conf. (Feb. 21–24, 1993).

Ulbrieht, et al., Abstr. of Plaste KauL 18(4), CAPLUS 1971:421192, pp. 250–4, 1971.

Sihn, J.H. et al., Adv. Organomet. Chem. 18, 99, pp. 123–130, 1980.

Godian et al., Principles of Polymerization, 2d Ed., Wiley, New York. pp. 99–102 & 616, 1981.

Ahadian et al., Abstr. of Proc IUPAC Macromed Symp., 28th, CAPLUS 1983:522989. p. 256 (1982).

Moore, Stephen, Crystalline PS is Claimed to Yield Engineering–Resin Performance, Modern Plastics, vol. 69 No. 11, p. 30 (Nov. 1992).

Lai, S. et al., CGCT: New Rules for Ethylene $\alpha$–Olefin Interpolymers–Controlled Melt Rheology Polyolefins, ANTEC '93. pp. 1188–1192 (1993).

Van der Sanden, D., A New Family of Linear Ethylene Polymers with Enhanced Sealing Performance Designed for Multilayer Barrier Food Packaging Films, ANTEC '93, pp. 46–50 (1993).

Patel, R.M. et al., Investigation of Processing–Structure–Properties Relationships in Polyethylene Blown Films, ANTEC '93, pp. 465–367 (1993).

Butler, T.I. et al., Blown Film Bubble Forming and Quenching Effects on Film Properties, ANTEC '93, pp. 51–57 (1993).

Woo, L. et al., Thermoplastic Elastomer Behavior of Ultra–Low Density Polyethylene and a Comparison with Flexible PVC, ANTEC '93, pp. 358–363 (1993).

Story, B.A. et al., The New Family of Polyolefins from INSITE* Technology, METCON '93 (1993).

Leaversuch, Robert D., New Process Technologies May Expand Properties, Markets, Modern Plastics, vol. 70/No. 1, p. 58 (Jan. 1993).

Leaversuch, Robert D., Reformulatioes, Redesigns Upgrade Blood Devices, Modern Plastics, vol. 70/No. 2, p. 44 (Feb. 1993).

Edmondson, M.S. et al., CGCT: New Rules for Ethylene Alpha–Olefin Interpolymers–Processing–Structure–Property Relationships in Blown Films, ANTEC '93, pp. 63–65 (Feb. 1993).

Kiesche, Elizabeth S., Catalysts, Additives, Environment Head Up CMRA Meeting Agenda, Chemical Week, p. 10. (Feb. 3, 1993).

Union Carbide Unveils Unipol II. Press Association Newfile, (Mar. 1, 1993).

Union Carbide Unveils Unipol II Process, . . . , Plastics Focus, vol. 25, No. 5 (Mar. 8, 1993).

Rotman, David, Carbide to Debut Unipol II Technology at New Plant, Chemical Week, p. 6 (Mar. 10, 1993).

Kaminsky. W. et al., *Structure Dependence of Polypropylenes on Structural Elements of Metallocene Catalysts*, Institute for Technical and Macromolecular Chemistry, University of Hamburg, PMSE #14 (No date).

Chien, James C.W., *Stereochemical Control of Synthesis of Polyolefins Having New Structures*, Department of Polymer Science and Engineering, University of Massachusetts, Amherst, MA 01003, PMSE #15 (No date).

Swogger, Kurt W. et al., Process Technology for Unique Polymer Design Using DOW Constrained Geometry Catalyst, SPE :II International Polyolefins RETEC Conference Proceddings. pp. 13–20 (1993).

Sherman, J., Polyolefins, Chemical Engineering, vol. 99, No. 8, p. 61 (No date).

Miller, Bernie, New Film Resins Push Performance, Plastics World, vol. 50/No. 6, p. 46 (May, 1992).

Leaversuch, Robert, Polyolefins Gain Higher Performance from New Catalyst Technologies, Modern Plastics, pp. 46–49 (Oct. 1991).

Nifant'ev. I.E. et al., ansa–Metallocene Derivatives of $Tj^{IV}$ and $Zr^{IV}$ With the Shortest $-C(CH_1)_2-$Bridge, Journal of Organomealic Chemistry. vol. 435, pp. 37–42 (1992).

Van der Sanden, D., A New Family of Linear Ethylene Polymers, TAPPI Proceedings, pp. 289–296 (1991).

Exxon Cites 'Breakthrough' in Olefins Polymerization. Modern Plastics, vol. 68/No. 7, p. 61 (Jul. 1991).

McKeever, Dennis, *Dow Plastics Editor Briefing* (Dec. 17, 1991).

Sishta, Chand et al., Group 4 Metallocene–Allumoxane Olefin Polymerization Catalysts, J. Am. Chem. Soc., vol. 114, pp. 1117–1114 (1992).

Swogger, Kurt W., The Material Properties of Polymers Made from Constrained Geometry Catalysts, SPO '92, pp 155–165 (1992).

Collins, Scott et al., Polymerization of Propylene Using Supported, Chiral, ansa–Mettalocene Catalysts: Production of Polypropylene with Narrow Molecular Weight Distributions, Macromolecules, vol. 25, pp. 1780–1785 (1992).

Llinas, Geraldo Hidalgo et al., Crystalline–Amorphous Block Polypropylene and Nonsymmetric ansa–Metallocene Catalyzed Polymerization, Macromolecules. vol. 25, pp. 1242–1253 (1992).

Trudell, B.C. et al., Single Site Catalyzed Ethylene Copolymers: Structure/Property Relationships, ANTEC '92, pp. 613–61 (1992).

Chien, James C.W. et al., Metallocene Catalysts for Olefin Polymerizations. Journal of Polymer Science, vol. 30, pp. 2601–2617 (1992).

Wood, Andrew et al., The Polyolefin Revelution , Chemical Week, p. 52 (May 13, 1992).

Leaversuch, R., Battle for Octene–Equivalency in LLDPE Film Heats Up, Modern Plastics, pp. 24–26 (Jun. 1992).

Wood, Andrew, Metallocenes—The Race to Breed a New Generation of Catalysts, Chemical Week, p. 42, (Jul. 1, 1992–Jul. 8, 1992).

Schwank, G. Don, Constrained Geometry Catalyst Technology (CGCT) Polymers, SPO '92 (Sep. 23, 1992).

Marino. R., New Polyolefin Resins Emerrs: 'Branched Linear' Copolymers, Modern Plastics, pp. 20–25 (Nov. 1992).

*Dow's 1992 Ended with a Welcome Surprise Thanks to the U.S. Patent Office*, p. 2.

Stevens, James C., INSITE™ Catalyst Structure/Activity Relationships for Olefin Polymerization, METCON '93 (1993).

Herfert, N. et al., *Copolymerization of Erbene and α–Olefins With Stereorigid Metallocene/MAO Ziegler Catalysts: Kinetic and Mechanistic Insight*, Max–Planck–Institut fur Kohlenforschbung, Kaiser–Willhelm–Platz 1, 4330 Mülheim, a.d. Ruhr, FRG, PMSE #16.

Collins, S., *Copolymerization of Dienes in the Presence of Cationic Metallocene Catalysts*.

Grubbs, R.H. et al., *Ring Opening Metathesis Polymerization Catalysts*, Division of Chemistry and Chemical Engineering. California Institute of Technology, Pasadena, CA, INOR #353.

Yu, T., *Polyolefin Modification with EXACT™ Plastomers*, pp. 539–564.

Knight, G.W. et al., Constrained Geometry Catalyst Technology: New Rules for Ethylene α–Olefin Interpolymers—Unique Structure and Property Relationships, Dow Plastics, Freeport, TX, pp. 226–241 (1993).

Waymouth, R.M. et al., *Cyclopolymerization of Dienes in the Presence of Cationic Metallocene Catalysts*, Department of Chemistry, Stanford University, Stanford, CA, INOR #355.

Fries, Richard W. et al., *Organometallic Modified Polyolefin Catalysts for Enhanced Molecular Properties*, Quantum Chemical Company, Morris, IL.

Sebanobish, K. et al., Effect of Chain Microstructure on Modulus of Ethylene–α–Olefin Copolymers, J. Appl. Pol. S., pp. 887–894 (1994).

Godwin, G., Ltd., in Assoc, w/The Plastics and Rubber Institute, *Flow Properties of Polymer Melts*. p. 71 (1981).

Dealy, John M. et al., *Melt Rheology and it's Role in Plastics Processing*, pp. 374–376 (1990).

Schwank, G. Don. Single–Site Metallocene Catalysts Yield Tailor–Made Polyolefin Resins, Modern Plastics, pp. 49–50 Aug. 1993).

Schwank, G. Don, A New Family of Resins, Converting Magazine, pp. 71–80 (Sep. 1993).

Schwank, G. Don. A New Family of Resins—Part II, Converting Magazine (Oct. 1993).

Barry, R.P. et al., Designed Polymers with INSITE Technology, Polyethylene '93, (Oct. 4, 1993).

Plumley, T.A. et al., Rheological Molding of INSITE Technology Polymers, ANTEC '94, pp. 1221–1225 (1994).

Polymers are Commercial, Food Engineering, p. 72 (Feb. 1993).

Lancaster, Gerald et al., Global Product and Application Development Utilizing INSITE Technology, METCON '94 (May 1994).

Stevens, J., INSITE Catalyst Str./Activity Relationship for Olefin Polymerization. METCON (May 1993).

Van der Sanden, D. et al., A New Family of Linear Ethylene Polymers with Enhanced Sealing Performance, TAPPI Proceedings. 1991 Polymers. Laminations & Coatings Conference, pp. 289–296.

Swogger, K.W. et al., Novel Molecular Structure Opens Up New Applications for Insite Based Polymers, SPO '93.

Mergenhagen, L., Polyolefin Plastomers as Sealants in Packaging Applications, TAPPI (Sep. 1993).

Pappas, Chris et al., Affinity Polyolefin Plastomers and Engage Polyolefin Elastomers: . . . CMSR (May 1994).

Swogger, K.W, et al., Improving Polymer Processability Utilizing CGSS Catalyst Technology, NPEC (Jun. 1994).

"Exact 3024 ™Plastomer for Cast Film Applications," published by Exxon Chemical, dated Nov. 1995, one page.

"Exact 3027 ™Plastomer for Cast Film Applications," published by Exxon Chemical, dated Nov. 1995, one page.

"Montell Polyolefins, Catalloy Process Polymer," Development Data Sheet on Montell KS–021P. Thermoplastic Olefin for Impact Modification and Extrusion, one page, published by Himont Incorporated, 1993.

* cited by examiner

STRUCTURES OF POLYMERS MADE FROM SINGLE SITE CATALYSTS

This application is a continuation-in-part of U.S. application Ser. No. 08/488,151, filed Jun. 7, 1995 now abandoned, a division of U.S. application Serial No. 08/082,226, filed Jun. 24, 1993, now abandoned.

BACKGROUND OF THE INVENTION

Polymeric materials have many applications in packaging structures. They are used as films, sheets, lidstock, pouches, tubes and bags. These polymeric materials may be employed as a single layer or one or more layers in a structure. Unfortunately, there are countless polymeric materials available. Furthermore, resin suppliers frequently have a tendency to claim many more applications for a product than the product is actually suitable for. In addition, in view of the specialized applications and processing problems that are encountered despite the suppliers' claims, one skilled in the art can not tell whether a particular resin will be suitable for an application unless tested. However, for various reasons there are frequently drawbacks to the use of many of these polymeric materials. For example, ethylene vinyl alcohol is an excellent oxygen barrier material for use in packaging food products. However, this polymeric material can be affected by moisture that is present in the atmosphere or the packaged product. As a result, it is frequently found that some polymeric materials are better for certain applications than others.

One area where there is a need for suitable resins in film applications is in the area of heat shrinkable films. Heat shrinkable polymeric films are commonly used in packaging meats, particularly primal meat cuts and other large pieces of meat. While this description will mainly detail the usage of films for packaging meat and meat by-products, it will be understood that these films are also suitable for packaging a myriad of other products, including food products, and non-food products, for example, dentifrices, cosmetics and pharmaceuticals.

Some of the films embodying the present invention are intended to be used by meat packers in the form of heat shrinkable bags with one opened end, which bags are closed and sealed after insertion of the meat. After the product is inserted, air is usually evacuated from the package and the open end of the bag is closed. Suitable methods of closing the bag include heat sealing, metal clips, adhesives, etc. Heat is applied to the bag once sealing is completed to initiate shrinkage of the bag about the meat.

In subsequent processing of the meat, the bag may be opened and the meat removed for further cutting of the meat into user cuts, for example, for retail cuts or for institutional use.

Suitable shrink bags must satisfy a number of criteria. Many bag users seek a bag that is capable of surviving the physical process of filling, evacuating, sealing and heat shrinking. For example, during the shrinking process great stress can be placed on the film by the sharp edges of bone in the meat. The bag must also have sufficient strength to survive the material handling involved in moving the large cuts of meat, which may weigh a hundred pounds or more, along the distribution system. Because many food products including meat deteriorate in the presence of oxygen and/or water, it is desirable that the bags have a barrier to prevent the infusion of deleterious gases and/or the loss or addition of moisture.

Conventional packaging for many products has frequently been made of multiple layer films having at least three layers. These multiple layer films are usually provided with at least one core layer of either an oxygen barrier material such as a vinylidene chloride copolymer, ethylene vinyl alcohol, a nylon or a metal foil, preferably aluminum. Heat shrinkable meat bags, for example, have generally used vinylidene chloride copolymers. The copolymer of the vinylidene chloride may, for example, be a copolymer with vinyl chloride or methyl acrylate. Collapsible dispensing containers in the form of tubes may or may not use one or more foil layers. The foil layers in addition to supplying an oxygen barrier also provide the dispensing tube with "deadfold", i.e., the property of a collapsible dispensing tube when squeezed to remain in the squeezed position without bouncing back. Collapsible dispensing tubes employing a foil layer are disclosed in U.S. Pat. No. 3,172,571 and U.S. Pat. No. 3,347,419, the disclosures of which are incorporated herein by reference. However, collapsible dispensing tubes do not require a foil layer. They may employ only one or more layers of thermoplastic or polymeric materials. Examples of such tubes are disclosed in U.S. Pat. No. 4,418,841 and U.S. Pat. No. 4,986,053, the disclosures of which are incorporated herein by reference. Methods of making collapsible dispensing tubes are well known and are disclosed in the above and other U.S. patents. Generally, foilless plastic tubes have a body wall which can be a single layer plastic sheet or film which can be extruded in tubular form and cut into desired lengths. Multilayer plastic sheet and film can be made by lamination, including coextrusion coating, processes, or by coextrusion processes such as cast coextrusion through a flat die, or tubular coextrusion through a tubular die. Single and multilayer sheet or film that has been cast or laminated typically is shaped about an elongated cylindrical mandrel and sealed to itself along a side seam to form a tubular body. Single and multilayer sheet or film that is respectively extruded or coextruded through a tubular die can be extruded in near final dimensional and vacuum sized to final dimension. Single or multilayer sheet and film can be coextruded and blown as a larger tubular form, which can be cut lengthwise and formed into a tube as would be a flat sheet or film. The formed tubular body wall is joined to a head typically having a neck with a dispensing orifice, and a shoulder. One end of the tubular body is joined to the shoulder of the head. The head can be pre-formed by compression or injection molding. Usually, the tubular body is inserted into a die and a head is injection molded onto the end of the tubular body such that the head and tubular body are fused or bonded together. The die which forms the head can be one which is shaped to form a head having an integral cap having an integrally formed hinge. Typically, the tube head is sealed by a cap, filled through the tube's lower open end, and sealed at that end. While collapsible dispensing tubes are generally made as described above, some collapsible dispensing tubes and some containers are made by an extrusion blow molding process in which a single or multilayer parison or preform is extruded and then blown in a mold into the desired shape of the finished container, for example, one having an integral body wall, shoulder, neck and closed bottom. Some containers including collapsible dispensing tubes, are made by injection molding such that they have an integral body wall, shoulder, and neck which can have an integrally formed hinge and cap, and an open bottom.

Outer layers of films and body walls of containers used in packaging food products can be any suitable polymeric material such as linear low density polyethylene, low density polyethylene, blends of these polyethylenes, and ionomers, including sodium and zinc ionomers. Such ionomers include Surlyn, ethylene vinyl acetate etc. In conventional shrink bags, the outer layers are generally linear low density polyethylene or blends thereof. Suitable outer layers for meat bags are taught by U.S. Pat. No. 4,457,960 to Newsome, the disclosures of which are incorporated herein by reference.

While conventional films have been suitable for many applications, it has been found that there is a need for films that, for example, are stronger and more easily processed than conventional films. In meat bags, there is a need for films and bags that have superior toughness and sealability and the ability to undergo cross-linking without undue deterioration. Thus, it is an object of the present invention to provide improved structures, including single and multilayer films, sheets, lidstock, and containers, for example, pouches, tubes and bags. In particular, there is a need for structures for use in shrink bags wherein the shrink bags are capable of withstanding production stresses and the shrink process.

It has also been found that there is a need for containers, for example, collapsible dispensing containers or tubes having good bond strength between a propylene polymer layer or component and an ethylene polymer component. Thus, another object of this invention is to provide improved polymeric structures with improved bonding properties. For example, it is known that in the packaging industry, it has been difficult to bond a structure, such as a collapsible dispensing tube head or layer, or simply a layer made of a propylene polymer, such as polypropylene or a propylene ethylene copolymer, directly to a structure, for example, a layer made of an ethylene polymer, for example, a low density polyethylene ("LDPE"). While it is known to add an ethylene polymer to a propylene polymer structure to improve adhesion to the ethylene polymer structure, it has heretofore been necessary to add a major amount of the ethylene polymer to sufficiently improve the adhesion. This has been undesirable. In adding a major amount, the desired properties of the propylene polymer have been significantly diminished. For example, collapsible dispensing tube heads having an integral flip top cap integrally joined to the head by a living hinge are usually made of a propylene polymer, e.g., polypropylene or a propylene ethylene copolymer, because the material properties of the polypropylene permit the hinge to be flexed repeatedly over time without cracking or breaking. Adding a major amount of a polyethylene to the propylene polymer employed to form the tube head to obtain satisfactory adhesion to a polyethylene body wall layer results in diminished hinge flexibility and/or early hinge failure. Further, since tube heads made of propylene polymer heretofore could not be satisfactorily bonded directly to a collapsible dispensing tube body wall layer of polyethylene, the packaging industry has been limited in types of heads and head materials that can be employed, and in the types of body wall layer materials that can be bonded to propylene heads. It therefore is a main objective of this invention to provide good bonding of a structure, for example, a collapsible dispensing tube head, or a layer, comprised of a propylene polymer, to a structure, for example, a tube body wall layer comprised of ethylene polymer.

Another objective of the invention is to provide a packaging structure or film having a layer of propylene polymer which can be, or which is satisfactorily bonded to a contiguous layer of an ethylene polymer.

Another object of the invention is to provide a container, for example, a collapsible dispensing container or a collapsible dispensing tube head comprised of a propylene polymer, joined or which can be joined with good bond strength directly to a structure, for example, a layer, or a body wall or side wall layer of a container or tube, where the layer is comprised of a polyethylene.

Another object of this invention is to provide an above-mentioned collapsible dispensing container or tube which does not stress crack between its first ethylene polymer body wall layer and its propylene polymer head after the dispensing container or tube has been exposed to stress crack inducing agents.

Another object of the invention is to provide a collapsible dispensing container or tube such as mentioned above, whose head has an integral cap joined directly to the head by an integral living hinge which can undergo 10,000 flexing cycles without undergoing stress fracture or failure.

Yet another object of this invention is to provide a method for improving the adhesion between the above-mentioned structures without the use of an adhesive.

SUMMARY OF THE INVENTION

The structures of the present invention may be single or multilayer films, sheets, lidstock, pouches, containers, tubes and bags where at least one layer contains a polymer, usually a copolymer, formed by a polymerization reaction in the presence of a single site catalyst such as a metallocene. Examples of such a polymer are ethylene and propylene polymers and copolymers thereof. One preferred copolymer is a copolymer of ethylene and an alpha olefin where such alpha olefin has a carbon chain length of from $C_3$–$C_{20}$. The structures of the present invention may also include blends of polymers and copolymers formed by a polymerization reaction with a single site catalyst or blends of a polymer and copolymer formed by a polymerization reaction with a single site catalyst and another polymeric material. Examples of suitable polymers for blending include: high and medium density polyethylene (HDPE, MDPE), linear low density polyethylene (LLDPE), low density polyethylene (LDPE), ethylene vinyl acetate (EVA), ultra low density polyethylene (ULDPE or VLDPE), polypropylene (PP) and ionomers such as Surlyn.

The present invention may also be a multilayer structure of at least two layers, or at least three layers wherein the core layer is a barrier layer. In one embodiment of the present invention, there may be a first outer layer of an ethylene or propylene polymer or copolymer formed by a polymerization reaction in the presence of a single site catalyst, a barrier layer and a second outer layer of a polymeric material. The second outer layer may be an ethylene or propylene polymer or copolymer formed by a polymerization reaction in the presence of a single site catalyst or a layer of another polymeric material such as high density polyethylene, medium density polyethylene, linear low density polyethylene, ultra low density polyethylene, low density polyethylene, ethylene vinyl acetate, an ionomer or blends thereof. The first outer layer may also be a blend of the ethylene copolymer with another suitable polymeric material such as described above. A preferred polymer formed by a single site catalyst is a copolymer of ethylene and an alpha olefin such as butene-1 or octene-1. Additional layers such as adhesive layers or other polymeric layers may be interposed in the structure between one or both of the outer layers or on top of one or both of the outer layers. The structure of the present invention may be rendered oriented either uniaxially or biaxially and cross-linked by any suitable means, such as for example irradiation or chemical cross-linking.

The present invention includes a structure in the form of a collapsible dispensing container which can be in the form of a tube comprised of a layer of, or comprised of a polymer, usually a copolymer, formed by the polymerization reaction with a metallocene catalyst system or with a single site catalyst, for example, a metallocene. The polymer can be an ethylene or propylene polymer. The layer can be a blend of said ethylene polymer or copolymer with a polyolefin. The ethylene polymer can be a copolymer or interpolymer of ethylene and a $C_3$–$C_2$ alpha olefin. The ethylene polymer preferably is a copolymer of ethylene and butene-1, preferably a linear ethylene butene-1 copolymer. The polyolefin of the blend can be a propylene polymer which can be polypropylene, a propylene copolymer, for example, a copolymer of propylene and ethylene, or a terpolymer of propylene, for example, an elastomeric terpolymer derived from ethylene and propylene. The propylene polymer of the blend can comprise a major amount, preferably about 70 to 90 wt. %, and the ethylene polymer of the blend can comprise a minor amount, preferably about 10 to about 30 wt. %, of the blend. In a preferred blend, the propylene polymer, for example, the elastomeric terpolymer of propylene and ethylene, can comprise about 85 to about 90 wt. % of the blend, and the ethylene polymer, for example, a copolymer of ethylene and an alpha olefin, can comprise about 10 to about 15 wt. %, of the blend. A preferred propylene polymer of the blend can comprise a copolymer of about 75 wt. % polypropylene and about 25 wt. % polyethylene, based on the weight of the copolymer. The propylene copolymer can have a density of about 0.899 to about 0.903 g/cm$^3$, a melt flow rate of about 2 g/10 min and a DSC melting point of about 161° C. The copolymer of ethylene and an alpha olefin, preferably a linear ethylene butene-1 copolymer, can have a melt index of about 3.5 to about 4.5 dg/min, a density of about 0.900 to about 0.905 g/cm$^3$, and a DSC peak melting point of about 92 to about 98° C.

The collapsible dispensing container or tube of the invention can have a body wall which is or includes a layer comprised of an ethylene polymer, sometimes referred to herein as a first ethylene polymer, and a contiguous layer comprised of a blend of a propylene polymer and an ethylene polymer, sometimes referred to herein as a second ethylene polymer.

The collapsible dispensing container or tube can be comprised of a head having a dispensing orifice and a shoulder, and a body wall layer joined directly to the head, the layer being comprised of a first ethylene polymer, and the head being comprised of a blend of a propylene polymer and a second ethylene polymer. In these containers, the second ethylene polymer of the blend is formed by the polymerization reaction with a metallocene catalyst system, or with a single site catalyst, for example, a metallocene. The containers of the invention can have a body wall layer comprised of a blend of about 85 to about 90 wt. % of a propylene terpolymer and about 10 to about 15 wt. % of the ethylene butene-1 copolymer. In the blend of the container or tube head, the propylene polymer can be a copolymer of about 75 wt. % polypropylene and about 25 wt. % polyethylene, based on the weight of the copolymer, and can comprise about 70 to about 80 wt. % of the blend, and the second ethylene polymer can be a copolymer of ethylene and an alpha olefin and can comprise about 20 to 30 wt. % of the blend.

The present invention includes a method for improving the adhesion between a first layer comprising a first ethylene polymer and a contiguous second layer comprising a propylene polymer, or for improving the adhesion between a collapsible dispensing container or tube head comprised of a propylene polymer and a collapsible dispensing tube body wall layer comprised of a first ethylene polymer, wherein the method can include blending with the propylene polymer which is to form the second layer or the tube head, a second ethylene polymer formed by the polymerization reaction with a metallocene catalyst system, or with a single site catalyst, which can be a metallocene. The method can also include blending with the first ethylene polymer which is to form the first layer, a propylene polymer, sometimes referred to herein as a second propylene polymer, formed by the polymerization reaction with a metallocene catalyst system, or with a single site catalyst, which can be a metallocene. The preferred method comprises blending a second ethylene polymer with the propylene polymer which is to form the second layer, or the tube head.

In the structures, containers and methods of the present invention, the tube head can have an integral cap that is integrally joined to the head by a living hinge.

DETAILED DESCRIPTION OF THE INVENTION

The structures of the present invention include films, sheets, lidstock, pouches, containers, tubes and bags. These structures may be a single layer or multi-layer structure. The structures are comprised of polymers that have been polymerized in the presence of a single site catalyst, such as a metallocene. A metallocene is a complex organometallic molecule typically containing zirconium or titanium, with a pair of cyclic alkyl molecules. More specifically, metallocene catalysts are usually compounds with two cyclopentadiene rings fixed to the metal. These catalysts are frequently used with aluminoxanes as a co-catalyst or an activator. One suitable aluminozane is a methaliumoxane (MAO). Besides, titanium and zirconium, hafnium may also be used as the metal to which the cyclopentadiene is bonded. Alternative metallocenes may include Group IVA, VA and VIA transition metals with two cyclopentadiene rings. Also mono-cyclopentadiene rings or sibyl amides may alternatively be in the metallocene instead of two cyclopentadienes. Other metals to which the cyclopentadine may be attached may include the metals in the lanthanide series. FIGS. 3, 4, 5 and 6 show representative metallocenes that are suitable single site catalysts.

While the reaction mechanism is not completely understood, it is believed that the metallocene, single site catalyst confines the copolymerization reaction to a single site over the polymer thus controlling comonomer placement and side chain length and branching. The copolymers formed from metallocene single site catalysts are highly stereo regular products with narrow molecular weight distribution. The metallocenes can be used to polymerize ethylene, propylene, ethylenic and acetylenic monomers, dienes and carbon monoxide. Comonomers with ethylene and propylene include styrene, substituted styrene, vinyl, acrylonitrile, methyl acrylate, methyl methacrylate and 1.4-hexadiene. The metallocene single site catalysts are capable of producing isotactic polymers and syndiotactic polymers, i.e., polymers in which the crystalline branches alternate regularly on both sides of the back bone of the polymer. There are two general types of single site catalyst reactions. The first are nonstereoselective catalysts reactions which have been developed by Exxon and Dow and which are used to make Exxon's Exact resins and Dow's CGCT resins. See FIGS. 3 and 4. The second type of reactions are stereoselective catalysts developed by Hoechst and Fina for stereo specific polymerization particularly of polypropylene and other olefins such as butene-1, and 4 methylpentene-1. See, e.g., FIGS. 5 and 6.

The ethylene alpha olefins polymerized by a single site catalyst have low crystallinity and a density that ranges from 0.854 to 0.97 gm/cc. Although this density range is similar to conventional ethylene polymers, i.e., LDPE, LLDPE and ULDPE, the polymers in the structures of the present invention have a narrow molecular weight distribution and homogeneous branching. The molecular weight distribution of the preferred polymers may be represented by the formula $MWD\ Mw/Mn = <2.5.$ The preferred polymers can have a MWD of from about 1.97, more preferably about 2.0 to about 2.2.

In addition, the melt processability of these polymers ($I_{10}/I_2$) has a range of about 5.5 to about 12 while conventional homogenous polymers are generally less than 6.5 at an MWD of 2. The melt tension of these polymers is in the range of about 1.5 to 3.5 grams.

The MWD of these polymers may be determined using a Water's 150 GPC at 140° C. with linear columns ($103_6$A-$10^6$A$_0$) from Polymer Labs and a differential refractometer detector. Comparison of the MWD of a 1MI, 0.920 density CGCT polymer with that of 1MI, 0.920 density conventional LLDPE illustrates the very narrow MWD of the CGCT polymers which usually have a Mw/Mn of approximately 2 compared to 3 or greater for LLDPE.

A preferred ethylene copolymer is a copolymer of ethylene and a $C_1$ to $C_{20}$ alpha olefin. A preferred copolymer is a low modulus ethylene octene copolymer sold by Dow. This copolymer is formed by Dow's constrained-geometry catalyst technology which uses a single site catalyst such as cyclo-pentadienyl titanium complexes. As best understood, Dow's constrained geometry catalysts are based on group XV transition metals that are covalently bonded to a monocyclopentadienyl group bridged with a heteroatom. The bond angle between the monocyclopentadienyl group, the titanium center and the heteroatom is less than 115°. When the alpha olefin is present in the copolymer in the range of about 10 to 20% by weight, these copolymers are referred to as plastomers. When the percent alpha olefin is greater than 20% these copolymers are called elastomers. The preferred ethylene octene copolymer has the octene comonomer present in an amount less than 25%. Examples of the Dow ethylene octene copolymer have the following physical properties.

| DENSITY g/cc | MOLECULAR WEIGHT DISTRIBUTION | MELT INDEX | MELT FLOW RATIO | MELT STRENGTH |
|---|---|---|---|---|
| Polymer 1. | | | | |
| 0.920 | 1.97 | 1.0 | 9.5 | 1.89 |
| 0.910 | 1.90 | 1.0 | 7.9 | 1.68 |
| 0.902 | 2.10 | 1.0 | 7.6 | 1.68 |

Molecular weight distribution is defined as the ratio of weight average molecular weight to number average molecular weight. The lower the figure, the narrower the molecular weight distribution. Melt flow ratio is defined as the ratio of melt index, as tested with a 10-kg load to the melt index with a 2-kg load. The higher the ratio, the more processable the material. Melt flow ratio is defined as melt tension measured in grams. The higher the number the greater the melt strength. Other suitable resins are the Exact resins sold by Exxon. Some of these resins have the following characteristics:

| | Typical properties of Exact medical grade polyethylenes | | | | | |
|---|---|---|---|---|---|---|
| | Value by grade | | | | | |
| Property | 4028 | 4022 | 4021 | 4023 | 4024 | 4027 |
| Melt index (D1238)* | 10 | 6 | 22 | 35 | 3.8 | 4 |
| Density, g./cc. (D-1505) | 0.880 | 0.890 | 0.885 | 0.882 | 0.885 | 0.895 |
| Hardness (0–2240) | | | | | | |
| Shore A | 78 | 84 | 84 | 80 | 83 | 89 |
| Shore D | 29 | 35 | 36 | 27 | 35 | 39 |
| Tensile Strength at break, p.s.i. (D-638) | 2220 | 1700 | 3260 | 620 | 2840 | 2200 |
| Tensile elongation at break, % (D-638) | >800 | >800 | >800 | >800 | >800 | >800 |
| Tensile impact, ft.-lb./sq. in. (D-1822) | 145 | 130 | 350 | 280 | 300 | 340 |
| Flexural modulus, p.s.i. (D-790) | 5040 | 4930 | 3980 | 3100 | 4180 | 7230 |

-continued

Typical properties of Exact medical grade polyethylenes

| | Value by grade | | | | | |
|---|---|---|---|---|---|---|
| Property | 4028 | 4022 | 4021 | 4023 | 4024 | 4027 |
| Vicat softening point ° F.(D-1525) | 138 | 168 | 158 | 138 | 158 | 181 |

\*: ASTM test method

The structure of the present invention is comprised of an ethylene, propylene, or styrene polymer or copolymer formed by a polymerization reaction in the presence of a single site catalyst preferably a metallocene. (The so-formed polymer or copolymer is sometimes referred to herein as the second polymer, for example as the second ethylene polymer, or as the second propylene polymer, to differentiate it from an ethylene or propylene polymer or copolymer that is not so formed, the latter sometimes being referred to as a first ethylene polymer or a first propylene polymer.) Ethylene may be copolymerized with any suitable monomer such as $C_3$–$C_{20}$ alpha olefin including propylene, butene-1, 1-pentene, 4-methyl pentene-1, hexene-1 and octene-1. A preferred comonomer is octene-1. Another preferred comonomer is butene-1. The preferred ethylene alpha olefin copolymer of the present invention has a density in the range of 0.880 gm/cc to about 0.920 gm/cc, a more preferred range of 0.890 gm/cc to about 0.915 gm/cc and a most preferred range of about 0.900 gm/cc to about 0.912 gm/cc.

Figure 1:
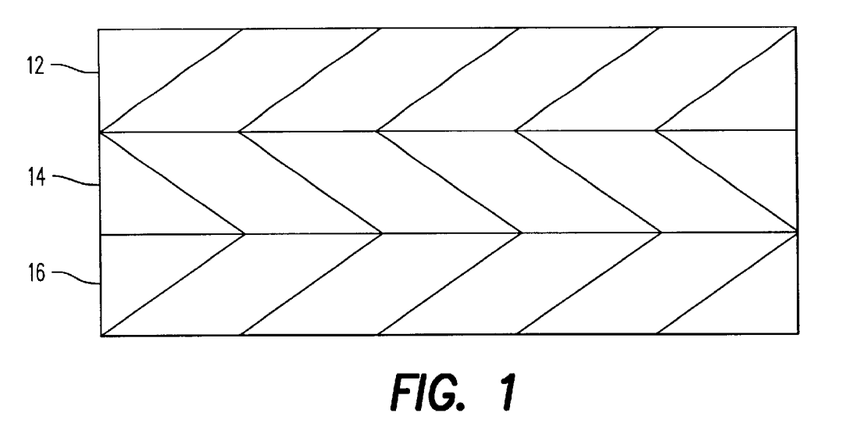
FIG. 1 is a vertical sectional view of a three layer structure of the present invention.

FIG. 1 shows a cross section of a three layer coextruded structure. Layer 14 is the core layer which may be a barrier layer that minimizes the transmission of oxygen through the structure. Preferred barrier materials are polyvinylidene chloride copolymers such as copolymers of vinylidene chloride and vinyl chloride or an alkyl acrylate such as methyl acrylate. Other preferred barrier materials include ethylene vinyl alcohol, nylon or a metal foil such as aluminum. Layer 14 may also be a copolymer of ethylene and styrene formed using a single site catalyst in the polymerization reaction. The copolymer of vinylidene chloride may also be polymerized by the polymerization reaction in the presence of a single site catalyst. In addition, layer 14 may also be a polystyrene formed by a polymerization reaction in the presence of a single site catalyst. One such polystyrene is the crystalline syndiotactic polystyrene sold by Idemitsu Petro-Chemical Co., Tokyo, Japan.

On opposite sides of the core layer 14 of FIG. 1 are layers 12 and 16. At least one of these layers 12 is a polymer formed by a polymerization reaction in the presence of a single site catalyst. The remaining layer 16 may be any suitable polymeric material such as a polyester, co-polyester, polyamide, polycarbonate, polypropylene, propylene-ethylene copolymer, ethylene-propylene copolymer, combinations of polypropylene and ethylene vinyl acetate copolymer, ultra low density polyethylene, low density polyethylene, medium density polyethylene, high density polyethylene, linear low density polyethylene copolymers, linear medium density polyethylene copolymer, linear high density polyethylene copolymer, ionomer, ethylene acrylic acid copolymer, ethylene ethyl acrylate copolymer, ethylene methyl acrylate copolymer, or ethylene methacrylic acid copolymer.

In an alternate embodiment, the layer 12 may be a blend of a polymer formed by a polymerization reaction in the presence of a single site catalyst and a suitable polymeric material such as is identified in connection with the description of layer 16 above.

Figure 2:
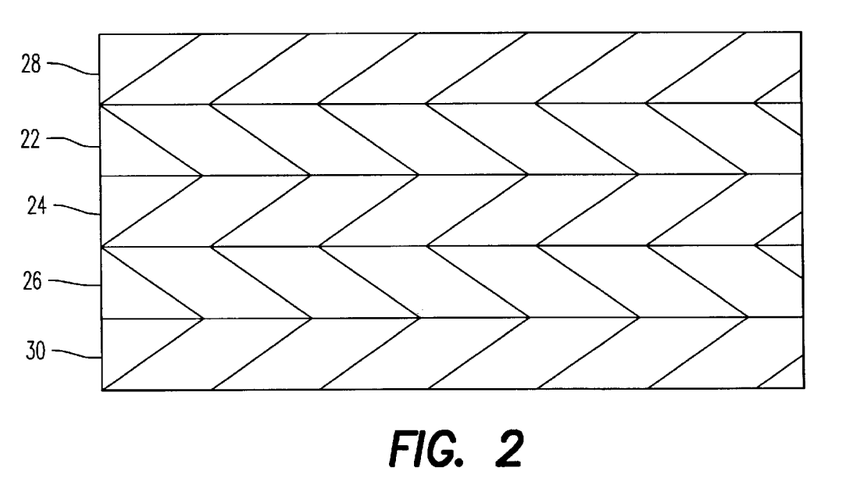
FIG. 2 is a vertical sectional view of a five layer film of the present invention.
Figure 3:
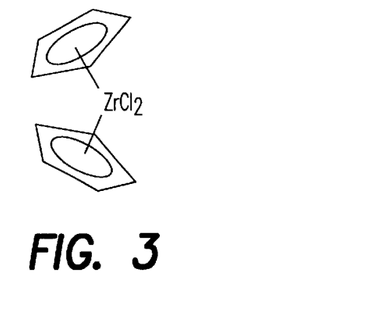
FIGS. 3–6 are examples of the structure of metallocene catalysts used in the polymerization of the polymer used in the structures of the present invention.
Figure 4:
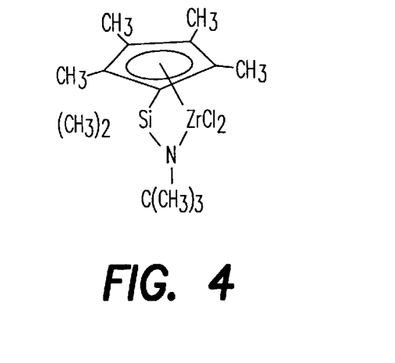
Figure 5:
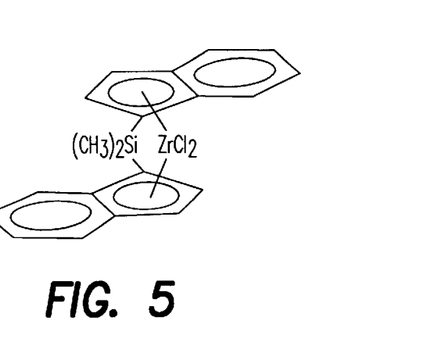
Figure 6:
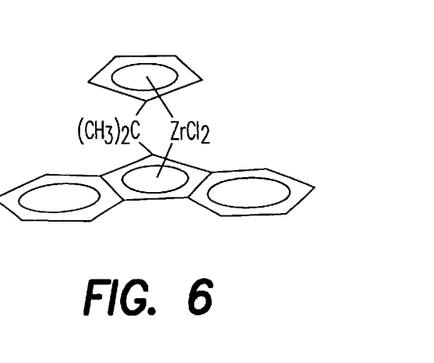

As seen in FIG. 2, the structure may also include embodiments which have a fourth layer 28 over the first layer 22 and a fifth polymeric layer 20 over the third layer 26. The composition of the fourth layer 28 may be selected from the same group of materials from which the composition of the first layer 12 or third layer 16 is selected, and the fifth layer 30 may also be the same composition as the first layer 22 or the third layer 26.

In an alternate embodiment of FIG. 2, the five layer structure may have a first layer 28 similar in composition to layer 12 of FIG. 1, i.e., the film may have a first layer of a polymer formed by the polymerization reaction with a single site catalyst or blends thereof with another suitable polymeric material. One or both of the second 22 and fourth 26 layers may be an adhesive layer.

The composition of adhesive layers 22 and 25 is selected for its capability to bond the core or barrier layer 24 to the surface layers 28 and 30. A variety of the well known extrudable adhesive polymers adhere well to the core or barrier layer 24. Thus, if for example layer 30 is a polypropylene, an adhesive polymer based on polypropylene is desirably selected for layer 26. Examples of such adhesives are the extrudable polymers available under the trade designations Admer QF-500, QF550, or QF-551 from Mitsui Petrochemical Company, or Exxon 5610A2.

If the composition of layer 28 or 30 is an ethylene based polymer or copolymer, an adhesive polymer based on ethylene is preferably selected for layer 22, including ethylene homopolymers and copolymers. Such a preferred adhesive composition is an ethylene vinyl acetate copolymer containing 25% to 30% by weight vinyl acetate. Other ethylene based homopolymers and copolymers modified to enhance adhesion properties are well known under the trade names of, for example, Bynel and Plexar. Typical base polymers for these extrudable adhesives are the polyethylene and the ethylene vinyl acetate copolymers. Such adhesive polymers, including the polypropylene-based polymers, are typically modified with carboxyl groups such as anhydride. Also acceptable as adhesives are ethylene methyl acrylate copolymers (EMA).

Additional layers may also be present in the structures of the present invention. For example, the present invention contemplates 4, 6, 7, 8, and higher numbers of layers in the film of the present invention and different combinations of layer structures may also be present. For example, there may be more than one barrier layer, i.e., two layers of polyvinylidene chloride copolymers, two layers of foil or two layers of EVOH or nylon. Alternatively, there may be a layer of EVOH and a layer of a polyvinylidene chloride copolymer or a polyamide or a polystyrene and other combinations of the core materials. The additional layers of the present invention also encompass more than one polymer formed by the polymerization reaction in the presence of a single site catalyst. The polymers may be in a layer alone or in the form of a blend. Suitable polymers for blending with an ethylene polymer formed in a polymerization reaction with a single site catalyst include other ethylene polymers formed in a polymerization reaction with a single site catalyst, LDPE, LLDPE, ULDPE, EVA, ionomers, ethylene copolymers, ethylene methyl acrylate (EMA), ethylene acrylic acid (EAA), ethyl methyl acrylic acid (EMAA), propylene polymers, e.g., polypropylene, (PP), ethylene normal butyl acrylate (ENBA), and ethylene propylene copolymers (PPE). Suitable polymers for blending with propylene polymers formed in a polymerization reaction with a single site catalyst include ethylene propylene copolymers.

Preferred blends using EVA's are those having lower VA content as they tend to yield EVA layers having better hot strength. EVA'S having higher VA content tend to yield EVA layers having increased adhesion to for example, the vinylidene chloride copolymer layer. EVA's having virtually any amount VA will have better adhesion to the vinylidene chloride copolymer layer than an ethylene homopolymer. However, good interlayer adhesion is considered desirable in the invention, and thus, steps are usually taken to enhance adhesion where no unacceptable negative effect is encountered. Thus, higher VA contents, in the range of 6% to 12* vinyl acetate are preferred, a melt index of less than 1 is also preferred. While blend amounts are shown herein in weight percent, VA contents are mole percent. Especially preferred EVA's have VA content of 7% to 9% and melt index of 0.2 to 0.8. Blends of EVA's to make up the EVA component of layers 16 and 18 are acceptable.

The structure of the present invention may be formed by any conventional process. Such processes include extrusion, coextrusion, extrusion coating, extrusion lamination, adhesive lamination and the like, and combinations of processes. The specific process or processes for making a given film which is neither oriented nor cross-linked can be selected with average skill, once the desired structure and compositions have been determined.

When the structure of the present invention is a film, the film may also be oriented either uniaxially or biaxially. Orientation can also be done by any conventional process for forming multiple layer films A preferred process includes the steps of coextrusion of the layers to be oriented, followed by orientation in one of the conventional processes such as blown tubular orientation or stretch orientation in the form of a continuous sheet, both being molecular orientation processes. The double bubble technique disclosure in Pahlke, U.S. Pat. No. 3,456,044 is suitable for use in producing the film of this invention. The films may also be formed by a tubular water quench process. In this process the film may be extruded downwardly as a tube formed by an annular die, and carried into a water quench tank, generally with a cascade of water on the outside surface providing initial cooling. The flattened tape is withdrawn from the quench bath, is reheated (normally in a second water bath) to its orientation temperature, is stretched in the machine direction between two sets of rolls that are so rotated as to establish a linear rate differential therebetween, and is simultaneously oriented in the transverse, or cross-machine, direction as an inflated bubble trapped between the nips of the rolls. In accordance with conventional practice the film will usually be cooled by air in the orientation zone.

The film of the present invention may also be oriented and/or cross-linked. The first step is the formation of a multiple layer film. The formation. of the multiple layer film, is usually most easily accomplished by coextrusion of the desired layers. Other formation processes are acceptable so long as the resulting oriented film at the conclusion of fabrication processing is a unitary structure.

The second step is orienting the multiple layer film. One method for accomplishing orientation is by heating the film to a temperature appropriate to molecular orientation and molecularly orienting it. The film may then be optionally heat set by holding it at an elevated temperature while its dimensions are maintained. The orientation step is preferentially carried out in line with the first step, which is the film formation step of the process.

The third step is subjecting the formed and oriented multiple layer film, to electron beam irradiation.

The amount of electron beam irradiation is adjusted, depending on the make-up of the specific film to be treated and the end use requirement. While virtually any amount of irradiation will induce some cross-linking, a minimum level of at least 1.0 megarads is usually preferred in order to achieve desired levels of enhancement of the hot strength of the film and to expand the range of temperature at which satisfactory heat seals may be formed. While treatment up to about 50 megarads can be tolerated, there is usually no need to use more than 10 megarads, so this is a preferred upper level of treatment, the most preferred dosage being 2 to 5 megarads.

The third step of subjecting the film to electron beam irradiation is performed only after the multiple layer film has been formed, and after molecular orientation, in those embodiments where the film is molecularly oriented. It should be noted that, in the irradiation step, all of the layers in the film are exposed simultaneously to the irradiation sources, such that irradiation of all the layers of the film takes place simultaneously.

In one embodiment of the process, the second step of orientation may be omitted and the unoriented multiple layer film may be cross-linked by irradiation treatment to produce a cross-linked, unoriented, multiple layer film.

EXAMPLES

Multilayer films may be prepared according to the present invention. Biaxially stretched three layer films may be prepared by a "double bubble" process similar to that disclosed in U.S. Pat. No. 3,456,044 by coextruding the following compositions through a multilayer die, biaxially stretching the coextruded primary tube. The films may also be irradiated if desired.

Example 1

Layer 1—copolymer of ethylene and an alpha olefin such as Hexene-1 or Octane-1 formed by the polymerization reaction in the presence of a single site catalyst or metallocene (hereinafter CEO)
Layer 2—vinylidene chloride—methyl acrylate (VDC-MA) copolymer
Layer 3—Polyolefin. This film may be biaxally stretched and if necessary irradiated.

|  | EXAMPLE 2 | EXAMPLE 3 | EXAMPLE 4 |
| --- | --- | --- | --- |
| Layer 1 | CEO | CEO | CEO-EVA blend |
| Layer 2 | VDC-MA | VDC-MA | VDC-MA |
| Layer 3 | ULDPE-EVA blend | CEO | CEO-EVA blend |

|  | EXAMPLE 5 | EXAMPLE 6 | EXAMPLE 7 |
| --- | --- | --- | --- |
| LAYER 1 | CEO | CEO | CEO-EVA blend |
| LAYER 2 | Nylon | Nylon | Nylon |
| LAYER 3 | CEO | ULDPE-EVA | CEO-EVA blend |

|  | EXAMPLE 8 | EXAMPLE 9 |
| --- | --- | --- |
| LAYER 1 | Polyolefin | Polyolefin |
| LAYER 2 | Styrene copolymer formed by the polymerization reaction with a single site catalyst | Propylene copolymer formed by the Polymerization |

|  | EXAMPLE 10 | EXAMPLE 11 | EXAMPLE 12 |
| --- | --- | --- | --- |
| LAYER 1 | CEO | CEO | CEO-EVA Blend |
| LAYER 2 | CEO | EVOH | EVOH |
| LAYER 3 | CEO | ULDPE-EVA Blend | CEO-EVA Blend |

|  | EXAMPLE 13 | EXAMPLE 14 | EXAMPLE 15 |
| --- | --- | --- | --- |
| LAYER 1 | CEO | CEO | CEO-EVA Blend |
| LAYER 2 | Tie | Tie | Tie |
| LAYER 3 | PVDC Copolymer or EVOH | PVDC Copolymer or EVOH | PVDC Copolymer or EVOH |
| LAYER 4 | Tie | Tie | Tie |
| LAYER 5 | ULDPE-EVA Blend | CEO | CEO-EVA Blend |

Example 16

LAYER 1 EVE-ULDPE
LAYER 2 ULDPE or CEO
LAYER 3 PVDC copolymer or EVOH
LAYER 4 EVA
LAYER 5 CEO or blend of CEO and EVA The following examples may also be prepared in accordance with the present invention:

Example 17

Meat Film—Forming Web Formed by TWQ Process (Tubular Water Quench Process)

LAYER 1 Nylon
LAYER 2 Tie
LAYER 3 EVOH
LAYER 4 Tie
LAYER 5 CEH or CEO

CEH is a copolymer of ethylene and Hexene-1 formed by the polymerization reaction in the presence of a single site catalyst or a metallocene. Other alpha olefins can be polymerized with the ethylene also.

Examples 18–20

Innerliner Films—These films can be formed either on a blown film line or by using a tubular water quench.

LAYER 1 HPDE
LAYER 2 Blend of CEH or CEO and EVA and polybutylene
LAYER 1 HDPE
LAYER 2 CEH or CEO and polybutylene
LAYER 1 HDPE
LAYER 2 CEH or CEO Examples 21 and 22

Meat—Non Forming Top Web film

LAYER 1 PVDC coated PET
LAYER 2 Adhesive (lamination)
LAYER 3 CEO or CEH
This film may be formed by adhesive laminating a film formed of a copolymer of ethylene and an alpha olefin with the PVDC coated PET film.
LAYER 1 PVDC coated PET
LAYER 2 LDPE-extrusion laminated
LAYER 3 LDPE/CEH or CEO coextrusion
This film can be formed by extrusion laminating a film of PVDC coated PET or LDPE.

Example 23

Layer 1—Blend of two or more copolymers of ethylene and an alpha olefin polymerized in the presence of a single site catalyst or metallocene such as CEO with either CEH or CEB. CEB is a copolymer of ethylene and butene-1 formed by a polymerization reaction in the presence of a single site catalyst or a metallocene.

Example 24

Layer 1—Blend of a copolymer of ethylene and an alpha olefin formed by a polymerization reaction in the presence of a single site catalyst or a metallocene with Polyethylene or other polyolefin such as EVA, EMA, EAA, EMMA, ionomers, ENBA, PP or PPE.

The films of example 23 and 24 can either be single layer films or multi layer films where additional layers are present on layer 1.

Figure 7:
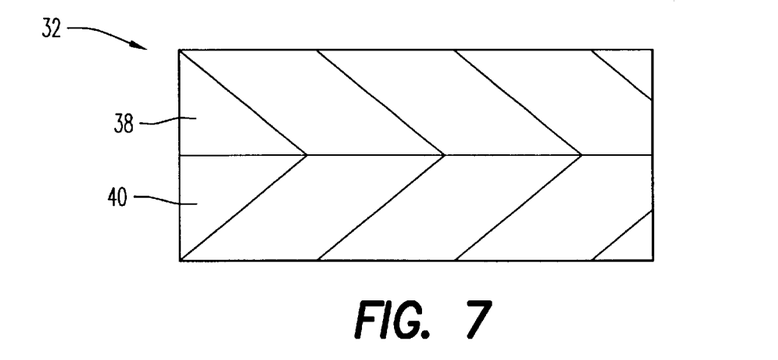
FIG. 7 is a vertical sectional view taken through a two layer film of the present invention.

FIG. 7 shows a cross section of a preferred structure, generally designated 32, having two layers. The structure can be or comprise the body wall 34 of a container, for example, the collapsible dispensing container shown in the form of a tube 36 in FIG. 8. Structure 32 is comprised of a structure or layer 38 comprising a first ethylene polymer, and a contiguous structure or layer 40 comprised of a propylene polymer blended with a second ethylene polymer formed by a polymerization reaction with a metallocene catalyst system, or with a single site catalyst, preferably a metallocene. The propylene polymer of layer 40 can comprise homopolymers and copolymers of propylene, such as polypropylenes, copolymers of propylene and ethylene (including copolymers of ethylene and propylene), and propylene terpolymers, for example, elastomeric terpolymers prepared or derived from unsaturated monomers comprising propylene and ethylene. The propylene polymer can also comprise blends of these polymers. Layer 40 of FIG. 7 is an example of layer 1 of Example 24.

The second ethylene polymer of the blend of layer 40 preferably comprises a copolymer or interpolymer of ethylene. Preferably, the ethylene polymer is a copolymer or interpolymer of ethylene and an alpha olefin, especially a $C_3$–$C_{20}$ alpha olefin. Preferred copolymers of ethylene and alpha olefins are ethylene butene-1 copolymers, particularly linear ethylene butene-1 copolymers.

The first ethylene polymer of layer 38 can comprise a low, linear low, very low or ultra low density polyethylene, a medium density polyethylene, a high density polyethylene, an ionomer, or any suitable blend or combination of such ethylene polymers.

Structure 32 can also be comprised of a first layer of a first propylene polymer of the type of propylene polymer described above in relation to the blend of propylene polymer and second ethylene polymer, and a second layer comprised of an ethylene polymer as described above in relation to first ethylene polymer, blended with a second propylene polymer formed by the polymerization reaction with a metallocene catalyst system or with a single site catalyst, preferably a metallocene. The second propylene polymer can comprise an interpolymer or copolymer of propylene and an alpha olefin, preferably a $C_3$–$C_{20}$ alpha olefin.

While structures or members such as a layer formed of a first polyethylene and structures or members such as a layer, or a collapsible dispensing container head formed of polypropylene usually do not adhere well to each other, as will be explained, structure 32, formed of layer 38 comprised of an ethylene polymer, and layer 40 comprised of a blend of a propylene polymer and a second ethylene polymer, has good interlayer adhesion.

Figure 8:
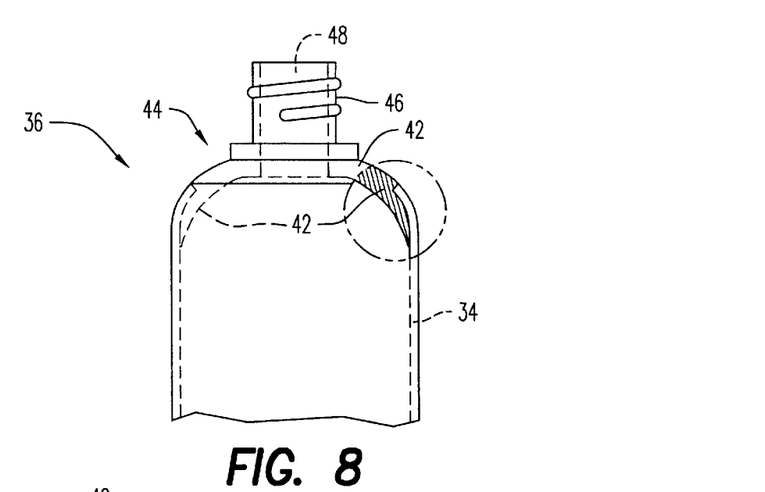
FIG. 8 is a front elevational view, with portions broken away and portions in vertical section, of a collapsible dispensing tube of the invention.

FIG. 8 shows a collapsible dispensing tube 36 comprised of a tubular body wall 34 joined at its upper end directly to the shoulder 42 of a head, generally designated 44, having a neck 46 with a dispensing orifice 48. The lower end (not shown) of body wall 34 can be sealed, for example by being brought together and sealed to itself by heat and pressure in a known manner. Head 44 preferably is comprised of a blend of a propylene polymer and a second ethylene polymer which can be such as those described above for layer 40 of FIG. 7. Although body wall 34 of collapsible dispensing tube 36 can be a single layer comprised of a first ethylene polymer such as described above for layer 38, as shown in FIG. 9, body wall 34 is a two layer structure such as shown in FIG. 7, wherein layer 38, comprised of the first ethylene polymer, is the inner layer that is fused or joined directly to, and therefore contiguous to head 42. Layer 4.0, comprised of the blend of a propylene polymer and a second ethylene polymer is the outer layer. As will be explained, good adhesion is obtained between inner layer 38 and shoulder 42 of head 44.

Figure 9:
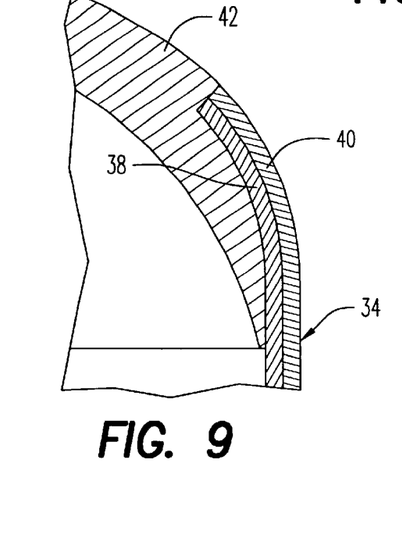
FIG. 9 is an enlarged view of encircled portion of the head and body wall of the collapsible dispensing tube of FIG. 8.
Figure 10:
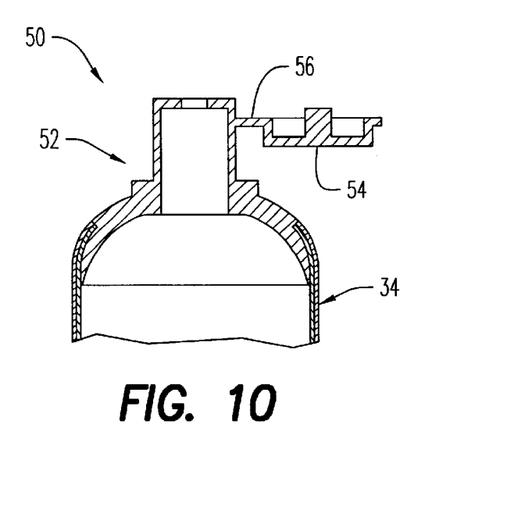
FIG. 10 is a vertical sectional view, with portions broken away, of an alternative collapsible tube of the invention.

FIG. 10 shows an alternative embodiment of a collapsible dispensing tube of the invention, generally designated 50, having a head 52 in turn having an integral cap 54 joined or attached to head 50 by an integrally formed flexible, living hinge 56. Head 52 can be comprised of the same polymeric material as head 44 of FIG. 8, and body wall 34 can be comprised of the same layers and layer materials as described for FIGS. 8 and 9.

The present invention includes improved structures, especially packaging structures, comprised of a first structure, component or member bonded to a second structure, component or member, preferably contiguously, wherein one of the structures, members or components is comprised of an ethylene polymer (sometimes referred to herein as a or the first ethylene polymer), and the other of the structures, components or members is comprised of a propylene polymer, and wherein the polymer of either structure is blended with and is a blend of a polymer formed by the polymerization reaction with a metallocene catalyst system, or with a single site catalyst, preferably a metallocene. The so-formed polymer can be an ethylene polymer (sometimes referred to herein as a or the second ethylene polymer) which is blended with the propylene polymer of one of the structures, and/or it can be a propylene polymer (sometimes referred to herein as a or the second propylene polymer) which is blended with the first ethylene polymer of the other structure. The invention is especially concerned with such improved structures, especially packaging structures, wherein the so-formed polymer is a second ethylene polymer, and it is blended with the propylene polymer of the propylene polymer structure. Thus, the present invention includes improved packaging structures where one of the first or second structures, components or members is comprised of a first ethylene polymer, and the other is comprised of a blend of a propylene polymer and a second ethylene polymer. The improved packaging structures have good bond strength, and there is no stress cracking between a first ethylene polymer body layer structure and a propylene polymer container or tube head structure, after the container or tube is exposed to stress crack-inducing agents. Also, desirable properties provided by the propylene polymer to its structure, for example, in providing flexibility to an integral living hinge which integrally joins a cap to a tube head comprised of a blend of propylene polymer and the second ethylene polymer, is not diminished as compared to such a tube head comprised of the propylene polymer without the second ethylene polymer.

The structures of the invention having improved bond strength include any first structure comprised of a first ethylene polymer and any second structure comprised of the blend of a propylene polymer and a second ethylene polymer. The structure can be merely two layers. Preferably, the structure is a packaging structure which can be a container, such as a collapsible dispensing container or tube, or its body wall or head, or a combination of such or other components. Thus, the structure can be comprised of a two layer film, side wall or body wall, wherein one layer is comprised of the first ethylene polymer and the other layer is comprised of the blend of propylene polymer and second ethylene polymer. The structure can also be comprised of such a two layer body or side wall or a single layer body or side wall comprised of first ethylene polymer, where the layer of first ethylene polymer of the single, double or multi-layer body wall is joined to a component of the package such as a collapsible dispensing container or tube head comprised of the blend of propylene polymer and second ethylene polymer.

The first ethylene polymer can be an ethylene homopolymer, copolymer, terpolymer or other interpolymer, or it can be a blend of any of such polymers. The first ethylene polymer can be an ethylene polymer such as described above in connection with layer 38 of FIG. 7 or 9. These first ethylene polymers are well known and often employed in the packaging industry. Collapsible dispensing containers or tubes have inner and outer surface layers either or both of which can be bonded to a tube head. Typically, the inner layer is bonded to the tube head and is comprised of LDPE, an LLDPE or a blend thereof. First ethylene polymers suitable for plastic tube extrusion, for lamination or extrusion overcoats, for use as an interior surface layer of collapsible dispensing containers and tubes are well known in the art. Suitable materials for such uses include LDPE's having a melt index of from about 0.10 to about 15.0 g/10 min, and a density of from about 0.910 to about 0.940 g/cm³. A preferred LDPE is currently available from Equistar, successor to Millenium Petrochemicals, Inc., under the trade designation Petrothene® NA-980-000, having a melt index of about 0.25 g/10 min and a density of about 0.920 g/cm³. Suitable LLDPE's for such uses may have similar melt index and density characteristics as the aforementioned LDPE's. A suitable first ethylene polymer can be a blend of about 75 wt. % of the above-mentioned LDPE and about 25 wt. % of such an LLDPE.

Propylene polymers which can be employed with the second ethylene polymers in the blends or structures of the invention, i.e., those propylene polymers which are not formed by the polymerization reaction with a metallocene catalyst system, or with a single site catalyst, include those propylene polymers referred to above in connection with layer 40 of FIGS. 7 and 9. Suitable propylene polymers are known in the art. Generally, suitable polypropylenes can have a melt index of about 0.10 to about 15.0 g/10 min, and a density of from about 0.870 to about 0.915 g/cm$^3$. Preferably, the propylene polymer, especially when it is a propylene terpolymer or propylene ethylene copolymer, has a melt flow rate of from about 0.7 to about 6 g/10 min, a density of about 0.870 to about 0.910 g/cm$^3$ and a DSC melting point of about 161° C.

Propylene polymers suitable for use as a single layer structure, or as a layer of a coextruded two-or-more layered structure, such as of a packaging film or of a body or side wall of a collapsible dispensing container or tube, include extrusion grade, high impact strength elastomeric propylene terpolymers derived from propylene and ethylene. The terpolymers can be derived from monomers, including, for example, higher olefins and dienes, capable of imparting elastomeric properties, such as improved impact strength, to the terpolymer. The monomers and the elastomeric propylene terpolymers are known in the art. Preferred propylene terpolymers include terpolymers of propylene, ethylene and a monomer capable of imparting elastomeric properties to the terpolymer. An example of a preferred extrusion grade, high impact strength elastomeric propylene terpolymer is available under the trade designation Montel KS-021P from Himont Incorporated. Typical properties of the terpolymer are a melt flow rate of about 0.9 dg/min (ASTM D-1238), a density of about 0.88 g/cm$^3$ (D792B), an initial hardness (Shore D) of about 48 (D2240) and after 75 seconds, about 38, a tensile strength at yield (50 mm/min) of about 1.4 K psi (D638), an elongation at yield (50 mm/min) of about 40% (D638), a Flexural Modulus (50 mm/min) of about 55 K psi (D790B), a Notched Izod Impact Strength of "nonbreak-flex"at 73° F. and at −40° F., and of 1.1 at −76° F., and a deflection temperature of about 120° F. at 66 psi. A preferred propylene polymer suitable for forming a tube head, especially a tube head with a living hinge as shown in FIG. 10, is Pro-fax 8623, a general extrusion or injection grade high impact strength polypropylene resin. It is a copolymer of about 75 wt. % polypropylene and about 25 wt. % polyethylene. Pro-fax 8623 is available from and is the trademark of Himont Incorporated. Pro-fax 8623 typically has a melt flow rate of about 2 dg/min (D1238), a density of about 0.9 g/cm$^3$ (D792A-2), a Rockwell hardness, R scale, of 66 (D785A), a tensile strength at yield of about 3,000 psi (D638), an elongation at yield of about 12% (D638), a flexural modulus of about 140,000 psi (D790B), a drop weight impact strength at −20° F. of 44 ft-lbs. (Himont Method), a Notched Izod Impact Strength at 73° F. of about 12 ft-lb/in, and a deflection temperature at 66 psi of about 162° F. (D648). Examples of propylene polymers that may be suitable for use with second ethylene polymers in the blends and structures of the invention include polypropylene compositions comprised of about 60 to 90 parts by weight of polypropylene and about 10 to 40 parts by weight of an ethylene/butene-1 polymeric mixture, such as are described in U.S. Pat. No. 4,734,459.

The ethylene polymer that is blended with the propylene polymer, i.e., the second ethylene polymer, includes the ethylene polymers disclosed above in connection with layer 40 of FIGS. 7 and 9. The second ethylene polymer is formed by the polymerization reaction with a metallocene catalyst system, or with a single site catalyst, for example, a metallocene. The second ethylene polymer can be linear or substantially linear. It can be a copolymer of ethylene, preferably a copolymer of ethylene and an alpha olefin, for example a $C_3$ to $C_{20}$ alpha olefin, preferably butene-1. More preferably, the second ethylene polymer is a linear ethylene butene-1 copolymer. "Linear" polymers are herein understood to mean that the polymers have no or no detected long chain branching. "Substantially linear" polymers are disclosed in patent literature as meaning that the polymer backbone is either unsubstituted or substituted with up to 3 long chain branches/1000 carbons. Such is herein understood to mean that such polymers have some long chain branching. The second ethylene polymer can have a melt index of about 0.10 to about 15.0 dg/min., preferably about 3.5 to about 4.5 dg/min., a density of from about 0.880 to about 0.920 g/cm$^3$, more preferably from about 0.890 to about 0.915 g/cm$^3$, and most preferably from about 0.900 to about 0.912 g/cm$^3$, and a preferred DSC peak melting point of from about 92 to about 98° C. Preferred linear ethylene butene-1 copolymers are available under the trade designations Exact™ 3024 and Exact™ 3027 from Exxon Chemical. Exact is a trademark of Exxon Chemical. These second ethylene polymers are produced using Exxon Chemical's EXXPOL technology.

| TYPICAL PROPERTIES OF EXACT 3024 AND 3027 POLYMERS AND FILMS* | | | | |
|---|---|---|---|---|
| | Exact 3024 | Exact 3027 | Units | ASTM Method |
| Polymer Properties | | | | |
| Melt Index | 4.5 | 3.5 | dg/min | D-1238(E) |
| Density | 0.905 | 0.900 | g/cm$^3$ | D-792 |
| DSC Peak Melting Point | 98 | 92 | ° C. | Exxon Method |
| Film Properties | | | | |
| 1% secant Modulus | | | psi | D-882 |
| MD | 13100 | 10100 | | |
| TD | 14300 | 11500 | | |
| Tensile Strength at Yield | | | psi | D-882 |
| MD | 870 | 770 | | |
| TD | 690 | 620 | | |
| Tensile Strength at Break | | | psi | D-882 |
| MD | 6900 | 8160 | | |
| TD | 3960 | 5210 | | |
| Elongation at Break | | | % | D-882 |
| MD | 390 | 450 | | |
| TD | 660 | 700 | | |
| Elmendorf Tear Strength | | | g/mil | D-1922 |
| MD | 180 | 60 | | |
| TD | 160 | 200 | | |
| Dart Drop Impact, F$_{50}$ | 170 | 410 | g/mil | D-1709 |
| Puncture, Force | 8.1 | 7.3 | lbs/mil | Exxon Method |
| Energy | 24.1 | 24.7 | in-lbs/mil | |
| Total Energy Impact | | | ft-lbs | D-4272 |
| At Room Temperature | 0.9 | 1.2 | | |
| At −29° F. | 0.7 | 0.7 | | |
| Haze | 0.5 | 0.4 | % | D-1003 |
| Gloss | 96 | 98 | % | D-2457 |

The blend of propylene polymer and a second ethylene polymer can comprise any suitable minor amount, i.e., less than 50 wt. %, of second ethylene polymer, the remainder being propylene polymer. Preferably, the blend comprises about 5 to about 49 wt. % of second ethylene polymer and about 51 wt. % to about 95 wt. % of propylene polymer, more preferably, about 70 to about 90 wt. % of propylene polymer, and about 10 to about 30 wt. % of second ethylene polymer.

For a two layer film or body wall of a collapsible dispensing tube comprised of a first layer of first ethylene polymer, preferably the LDPE Petrothene NA-980-000, bonded with good bond strength to a second layer of a blend propylene polymer and second ethylene polymer preferably comprised of the propylene terpolymer Montel KS-021 P, the blend preferably is comprised of from about 85 to about 90 wt. % of the propylene terpolymer, and about 10 to about 15 wt. % of second ethylene polymer, preferably the linear ethylene butene copolymer Exact 3024. The following two-layer body wall structures comprised of these materials were produced:

EXAMPLE 25

Composition

| | |
|---|---|
| Structure A | |
| Layer 1 | LDPE - Petrothene NA-980-000 |
| Layer 2 | Blend of: 90 wt. % Montel KS-012P, and 10 wt. % Exact 3024 |
| Structure B | |
| Layer 1 | LDPE - Petrothene NA-980-000 |
| Layer 2 | Blend of: 85 wt.% Montel KS-021P, and 15 wt. % Exact 3024 |

The two-layer structures were about 0.018 inch thick, the outer blend layer being about 30% and the inner LDPE layer being about 70% of the total thickness of the structure. The two layer structures were formed by a water quenched tubular coextrusion process during which the continuous tubular extrudate was vacuum calibrated by being expanded in a tubular vacuum chamber. The chamber's interior diameter was about 1.5 inch. The continuous tubular extrudate was cut into ten (10) tubular bodies, each 5 inches long. The tubular bodies had an internal diameter of about 1.509 inch, an external diameter of about 1.545 inch, and a wall thickness of about 0.036 inch. These tubular bodies were suitable for use as the body wall of a collapsible dispensing tube.

Adhesive Strength Test of Two-Layer Structures

The two layer tubular body wall structures shown as Structures A and B in Example 25 were tested for adhesive or bond strength. Strips ¼ inch wide were cut from the tubular bodies. The strips were mechanically held at one end and attempts were made at the other end of the strips to manually peel the outer layer away from the inner layer. While slight delamination occurred with control strips made from similar strips cut from similarly made two-layer coextruded tubular bodies having an outer layer of 100 wt. % of the propylene terpolymer Montel KS-012P and an inner layer of 100 wt. % of the LDPE Petrothene® NA-980-000, the strips of the two-layer tubular body wall Stuctures A and B of the invention had good bond strength. Their layers could not manually be pulled apart.

Additional test strips were made of two-layer water quenched coextruded tubular bodies, i.e., body wall structures, of the invention, these having an outer layer blend of 20 wt. % of the ethylene butene plastomer Exact 3024 and 80 wt. % of the propylene terpolymer Montel KS-012P, and a contiguous inner layer of 100% of the LDPE Petrothene® NA-980-000. These were tested as above and found to have good bond strength. However, the latter tubular bodies were less than wholly desirable for uses requiring a smooth outer surface feel, because the exterior surface of the outer blend layer of these test strips had a granular surface feel when passed against a person's lips.

Similar strips cut from two-layer tubular bodies of the invention obtained as above but whose outer layer blend contained 30% by weight Exact 3024 and the balance Montel KS-012P, were tested and found to have a good bond strength. They had an outer layer surface feel to the lips that was worse than those strips having 20% by weight of Exact 3024.

Similar strips obtained from similarly made two-layer tubular bodies of the invention having an outer layer blend of about 10 wt. % of second ethylene polymer Exact 3024 and about 90 wt. % of propylene polymer Montel KS-012P, a contiguous inner layer of the LDPE, Petrothene NA-980-000, and an outer to inner layer thickness ratio is 1:1, were tested and found to have good bond strength and a desirable smooth feel to the outer layer.

From the above tests, it was found that two-layer structures of the invention having an outer layer of a blend of from about 10 to about 30 wt. % of a second ethylene alpha olefin copolymer made from a polymerization reaction with a single site catalyst, and from about 70 to about 90 wt. % of a propylene polymer, and having a contiguous inner layer of first ethylene polymer, had improved adhesive strength as compared to a two-layer coextruded film having an outer layer 100% propylene ethylene polymer and an inner layer of a first ethylene polymer. It was also found that two-layer films of the invention having an outer layer of from about 10 to less than about 20 wt. % of an ethylene butene copolymer made from a single site metallocene catalyst and at least 80 to about 90 wt. % of a propylene polymer, and a contiguous inner layer of a first ethylene polymer, had an outer layer which for some uses had a more desirable, softer feel than the outer layer of similar structures having from about 20 to about 30 wt. % of the ethylene butene copolymer.

Bond Strength of Tubular Body Walls to Tube Heads

In order to test the adhesive or bond strength of a tubular body wall having an inner layer of a first ethylene polymer to a collapsible dispensing tube head made of blend materials of the invention which are disclosed as comprising the tube head shown in FIG. 8, four sets of such collapsible dispensing tube heads were injection molded and, during the process, fusion bonded to tubular body walls in a conventional manner described herein. These unfilled collapsible dispensing tubes were tested for head/body wall bond integrity and stress cracking. For a first test, four variables of blend materials were used to form the heads. Variables were 1 through 3 were blend materials of the invention.

First Set Of Tube Head Variables And Tests

| Variables | Head Resin Material |
|---|---|
| 1 | Blend of 70% polypropylene (PP)/30% LDPE* |
| 2 | Blend of 80% PP/20% LDPE** |
| 3 | Blend of 70% PP/30% LDPE** |
| 4 | Control: 100% LDPE |

The PP of the blends was Pro-fax 8623, a propylene-ethylene copolymer comprising about 75 wt. % PP and about 25 wt. % polyethylene, based on the weight of the copolymer. The properties Pro-fax 8623 are presented above. The LDPE* of the blend of Variable 1 was Exact 3027 and the LDPE of the blends of Variables 2 and 3 was Exact 3024, each Exact material being a linear ethylene butene plastomer made from a polymerization reaction using a metallocene single site catalyst whose properties are presented above. The LDPE used to form the Control head (Variable 4) is available under the trade designation Rexene 1011 from Huntsman, Corp. The LDPE of the Control head has a melt flow rate of about 1.0 g/10 min (ASTM D1 238-E), and a density of about 0.9205 g/cm$^3$ (ASTM-D792). The heads which were tested for bond strength and which were flex tested had a threaded neck for receiving a threaded cap, as shown in FIG. 8**.

Five sample tube heads were injection molded of the material of each variable. Sample tubes were made. Each of the sample tube heads was fusion bonded to a 1 3/8 inch diameter extruded single layer LDPE tubular body wall made of Petrothene NA-980-000, or an LDPE having a melt index of about 1.2 g/10 min. and a density of about 0.920 g/cm$^3$, available under the trade designation LDPE 2020T from E. I. DuPont de Nemours and Company.

First Head/Body Wall Bond Integrity Test

Each of the tubes made from the five samples of each head variable and of the Control was tested for head/body wall bond integrity. The tubular bodies were fusion bonded to the shoulders of the heads by placing an end of the tubular body in an injection mold and injecting the blend of propylene polymer and a second ethylene polymer material into a mold such that the end of the LDPE blend inner layer of the body wall was fused to the shoulder of the tube head. The tubular body walls were cut transaxially 2 inches from the shoulder. A 2" long 1/4 inch wide strip of the body wall was cut from the open end of the transaxial cut edge of the body wall up to but not including the shoulder, where the strip was left as-bonded to the shoulder. One inch of the strip was clamped into the top clamp and one inch of the tube body was clamped to the bottom clamp of an Instron tensile strength tester. The load cell of the tester was 100 KG. With the strip disposed at about 90° to the longitudional axis of the tube, the jaws were separated at a rate of about 8 inches per minute until the strip fractured or separated from the head. Peak Instron tensile strength values are shown in TABLE I below.

TABLE I

| Variable | Instron Tensile Pulls (KG) | | | | | Average |
|---|---|---|---|---|---|---|
| 1 | 4.88 | 5.88 | 4.0 | 4.36 | 3.85 | 4.6 |
| 2 | 3.57 | 3.0 | 2.53 | 2.24 | 3.65 | 3.0 |
| 3 | 5.08 | 3.97 | 5.7 | 4.37 | 3.87 | 4.6 |
| 4 | 5.18 | 4.93 | 4.39 | 627 | 5.75 | 5.3. |

The Instron test results in TABLE I indicate good head/body wall integrity for each variable and for the Control. All tubes tested above 1.2 KG which was the minimum acceptable value. Strips from all variables failed only by eventual fracturing, except for Variable 2 (80% PP/20% LDPE Blend) which had lower tensile values and failed by layer interface separation prior to breakage. The Instron tensile strength values shown in TABLE I are all well above 1.2 KG and, shown below, are superior to the values obtainable from attempting to bond the LDPE body wall layer to a tube head made of 100% propylene/ethylene copolymer, with respect to which no bond was obtained.

Second Set of Tube Head Variables and Test

For a second test, a second set of five variables of blend materials were used to form a second set of tube heads. In this test, Variables 6 through 8 were blend materials of the invention.

| Variables | Head Resin Material |
|---|---|
| 5 | Control: 100% PP |
| 6 | Blend of 90% PP/10% LDPE* |
| 7 | Blend of 80% PP/20% LDPE* |
| 8 | Blend of 70% PP/30% LDPE* |
| 9 | Control 100% HDPE |

For the second set of variables, the PP of the blends was Pro-fax 8623 and the LDPE* of the blends was EXACT 3027. The propylene polymer (PP) used to form the Control head, variable 5, was PRO-fax 8623. The HDPE used to form the Control head, Variable 9, was HDPE Alathon M4612 available from Equistar Chemicals and having a melt index of about 1.2 g/cm$^3$ and a density of from about 0.944 to about 0.948 g/cm$^3$. The heads which were tested for bond strength had a shoulder, a neck, a cap and a living hinge that integrally joined the cap to the neck, as shown in FIG. 10.

Six sample tube heads were injection molded of the material of each variable. Sample tube heads were made. Each of the sample tube heads was fusion bonded to a 1 3/8 inch diameter extruded single layer tubular body wall made of the LDPE Petrothene NA-980-000.

Second Head/Body Wall Bond Integrity Test

Each of the tubes made from the six samples of each Variable 5 through 8 was tested for head/wall bond integrity. The tubular bodies were fusion bonded to the shoulders of the tube heads as in the first test, and the same test procedure was employed as the in the first test. Peak Instron tensile strength values are shown in TABLE II below.

TABLE II

| Variable | Instron Tensile Pulls (KG) | | | | | | Average |
|---|---|---|---|---|---|---|---|
| 5 | N | N | N | N | N | N | N |
| 6 | N | N | N | N | N | N | N |
| 7 | 1.007 | 1.5557 | 1.471 | 1.098 | 1.391 | .7168 | 1.207 |
| 8 | 3.350 | 2.821 | 3.125 | 2.870 | 3.799 | 2.615 | 3.11 |
| 9 | 2.902 | 2.819 | 2.795 | 2.977 | 3.122 | 2.730 | 2.89 |

"N" indicates no bond was achieved even with attempts to use various injection pressures and temperatures.

The Instron test results in TABLE II indicate that no head/body wall bond was achieved for Variable 5 (Control 100% PP head) and Variable 6 (Head blend of 90% PP/10% LDPE*), an average minimally acceptable bond was achieved for Variable 7 (Head blend of 80% PP/20% LDPE*), and a satisfactory bond was achieved for Variable 8 (Head blend of 70% PP/30% LDPE*). The average bond for Variable 8 was greater than the average bond for Variable 9 (100% HDPE head).

Head Stress Crack Test

Five collapsible dispensing tubes taken from each of the Variables and from the Control of the lot of tubes made and first tested above for head/body wall bond strength were filled with a solution of 20% Nonox (nonoxynol-9 polyethylene glycol) available under the trade designation Igepal CO-630 from GAF, and 80% ethyl alcohol, in one series of tests, and with a solution of 20% Igepal and 80% water in another series of tests, to chemically accelerate aging of the tube head and body wall materials and thereby generate stress cracks at the bonded interface of the inner layer of the body wall and the shoulder of the tube head. The bottom ends of the filled tubes were sealed with clamps and placed and held in an oven at about 140° F. for various time periods ranging from 3 to 19 days. The head stress cracks (HSC) and side stress cracks (SSC) which resulted are shown in TABLE III below.

TABLE III

| Variables | 3 days | 7 days | 14 days | 19 days |
|---|---|---|---|---|
| Using: 20% Igepal/80% Alcohol (HSC/SSC) | | | | |
| 1 | 0/0 | 0/2 | 0/1 | 0/0 |
| 2 | 0/0 | 0/0 | 0/1 | 0/0 |
| 3 | 0/0 | 0/2 | 0/0 | 0/0 |
| Control | 0/0 | 0/0 | 0/2 | 0/0 |
| Using: 20% Igepal/80% Water | | | | |
| 1 | 0/0 | 0/0 | 0/1 | 0/0 |
| 2 | 0/0 | 0/0 | 0/0 | 0/0 |
| 3 | 0/0 | 0/0 | 0/0 | 0/0 |
| Control | 0/0 | 0/0 | 0/0 | 0/0 |

Table III shows that no head stress cracks were generated for any of the Variables or for the Control. While some side stress cracks (stress cracks of the tubular body wall) occurred, they were located next to the clamped end seal, well away from the head/body wall bond. These stress cracks are thought to have resulted from the stresses imparted by the end clamps.

Head Hinge Flex Tests

Collapsible dispensing tube heads having a cap integrally joined to the head by an integral living hinge or strap, as shown in FIG. 10, were flex tested. The tube heads were injection molded using the same materials as used for the variable and control materials employed in the first head/body wall bond integrity test and in the head stress crack test. Five tube heads of each variable and of the control were made, and the cap of each tube was mechanically moved from the open to closed to open positions (1 cycle) for 10,000 cycles without interruption. While two of the five control samples exhibited partial fracturing of the hinge, the hinges of all of the variables of the heads were satisfactory. They showed no signs of failure.

The above tests show that employing a blend of a second ethylene polymer, preferably an ethylene alpha-olefin copolymer made by a polymerization reaction using a single site catalyst, with a propylene polymer, preferably a propylene-ethylene copolymer, preferably in range of from about 20 to about 30 wt. %, more preferably from about 25 to about 30 wt. % of second ethylene polymer, with about 70 to about 80 wt. %, more preferably from about 70 to about 75 wt. % of propylene polymer, improves the bond strength of a collapsible tube head to a tubular body wall inner layer comprised of a first ethylene polymer, for example a LDPE. This is accomplished while maintaining, or without detracting from the flexibility or flex endurance through 10,000 open-close cycles of an integral living hinge of the head, as compared to the living hinge of a head made of 100% propylene polymer. Thus, a tube body wall layer or another layer, film or structure comprised of a first ethylene polymer can now be satisfactorily bonded to a layer, tube head or other structure made or comprised of a propylene polymer, if the propylene polymer is blended with a minor amount of a second ethylene polymer made by a polymerization reaction with a metallocene catalyst system, or with a single site catalyst, which can be a metallocene.

The present invention includes methods for improving the adhesion between two packaging structures, for example, between a first structure or layer comprising a first ethylene polymer and a contiguous second structure or layer comprising a propylene polymer, or for improving the adhesion between a collapsible dispensing container or tube head comprised of a propylene polymer and a collapsible dispensing tube body wall layer comprised of a first ethylene polymer, wherein the method comprises blending with the first ethylene polymer which is to form the first structure or layer and/or with the propylene polymer which is to form the second structure or layer or the tube head, a polymer formed by the polymerization reaction with a metallocene catalyst system, or with a single site catalyst, which can be a metallocene. In the method of the invention, the polymer which is blended can comprise a propylene polymer, and the propylene polymer is blended with the first ethylene polymer. Preferably, the polymer which is blended comprises a second ethylene polymer, and the second ethylene polymer, preferably a minor amount, is blended with the propylene polymer which is to form the second layer, or the tube head. The amount of the so-formed polymer which is blended, is any suitable amount given the materials and structures involved. The amounts to be blended are disclosed above. The so-formed polymer can be blended and extruded by conventional means and methods. For example, pellets of a second ethylene polymer such as Exact 3024, can be physically mixed or blended with pellets of the propylene polymer and fed to a conventional extruder in which the mixture of pellets is melt blended and coextruded through a tubular die operated under standard tube manufacturing conditions well known in the art.

We claim:

1. A collapsible dispensing container in the form of a tube, which comprises:
   a head having a dispensing orifice and a shoulder, and
   a body wall joined directly to the head by a layer comprised of a first ethylene polymer, the head being comprised of a blend of a propylene polymer and a second ethylene polymer formed by the polymerization reaction with a single site catalyst.

2. The container of claim 1 wherein the single site catalyst is a metallocene.

3. A container according to claim 1 wherein the ethylene polymer is formed by a polymerization reaction with a metallocene catalyst system.

4. The container of claim 1 wherein the propylene polymer comprises polypropylene.

5. The container of claim 1 wherein the propylene polymer comprises a propylene copolymer.

6. The container of claim 1 wherein the propylene polymer is a copolymer of propylene and ethylene.

7. The container of claim 1 wherein the propylene polymer is an elastomeric terpolymer of ethylene and propylene.

8. The container of claim 1 wherein the second ethylene polymer is a copolymer of ethylene and an alpha olefin.

9. The container of claim 1 wherein the second ethylene polymer is an interpolymer of ethylene and a $C_3$–$C_{20}$ alpha olefin.

10. The container of claim 1 wherein the second ethylene polymer is a copolymer of ethylene and butene-1.

11. The container of claim 1 wherein the second ethylene polymer is a linear ethylene butene-1 copolymer.

12. The container of claim 1 wherein the propylene polymer is a terpolymer of ethylene, propylene and a monomer capable of imparting elastomeric properties to the terpolymer, the second ethylene polymer is an ethylene butene-1 copolymer, and the blend comprises about 10 to about 15 wt. % of the terpolymer and about 85 to about 90 wt. % of the ethylene butene-1 copolymer.

13. The container of claim 12 wherein the second ethylene polymer is a linear ethylene butene-1 copolymer.

14. The container of claim 1 wherein the first ethylene polymer is a low density polyethylene.

15. The container of claim 12 wherein the first ethylene polymer is a low density polyethylene.

16. The container of claim 13 wherein the first ethylene polymer is a low density polyethylene.

17. The container of claim 1 wherein the first ethylene polymer is a high density polyethylene.

18. The container of claim 11 wherein the linear ethylene butene-1 copolymer has a melt index of about 3.5 to about 4.5 dg/min.

19. The container of claim 11 wherein the linear ethylene butene-1 copolymer has a density of about 0.900 to about 0.905 g/cm$^3$.

20. The container of claim 13 wherein the terpolymer has a melt flow rate of about 0.9 dg/min, and a density of about 0.88 g/cm$^3$.

21. The container of claim 1 wherein the propylene polymer is a copolymer of propylene and ethylene and the copolymer comprises about 75 wt. % polypropylene and about 25 wt. % polyethylene based on the weight of the copolymer.

22. The container of claim 21 wherein the copolymer of propylene and ethylene has a density of about 0.899 to about 0.903 g/cm$^3$, and a melt flow rate of about 2 g/10 min.

23. The container of claim 22 wherein the second ethylene polymer is a copolymer of ethylene and an alpha olefin and comprises about 20 to about 30 wt. %, and the copolymer of propylene and ethylene comprises about 70 to 80 wt. % of the blend.

24. The container of claim 23 wherein the copolymer of ethylene and an alpha olefin comprises an ethylene butene-1 copolymer, and the propylene polymer comprises a copolymer of propylene and ethylene comprising about 75 wt. % polypropylene and about 25 wt. % polyethylene, based on the weight of the propylene polymer.

25. The container of claim 24 wherein the copolymer of ethylene and an alpha olefin comprises a linear ethylene butene-1 copolymer.

26. The container of claim 24 or 25 wherein the copolymer of propylene and ethylene has a density of about 0.899 to about 0.903 g/cm$^3$, and a melt flow rate of about 2 g/10 min.

27. The container of claim 1 wherein the propylene polymer of the blend comprises about 70 to about 90 wt. % and the second ethylene polymer comprises about 10 to about 30 wt. % of the blend.

28. The container of claim 1 wherein the head has an integral cap that is integrally joined to the head by a living hinge.

29. The container of claim 28 wherein the copolymer of ethylene and a linear alpha olefin is a linear copolymer of ethylene and 1-butene, and said copolymer has a melt index of about 3.5 dg/min. and a density of about 0.900 g/cm$^3$.

30. The container of claim 1 wherein the second ethylene polymer comprises about 5 to about 49 wt. %, and the propylene polymer comprises about 51 about 95 wt. % of the blend.

31. The container of claim 1 wherein the second ethylene polymer is a copolymer of ethylene and a linear alpha olefin and comprises about 25 to about 30 wt. %, and the propylene polymer is a copolymer of propylene and ethylene comprises about 75 to 80 wt. % of the blend.

32. A method of forming a collapsible dispensing tube having a head comprised of a propylene polymer and a collapsible dispensing tube body wall layer comprised of a first ethylene polymer, which method comprises:
    blending with the propylene polymer which is to form the head, a second ethylene polymer formed by the polymerization reaction with a single site catalyst, using the blend to form the head, and joining the body wall layer to the head to form a tube.

33. The method of claim 32 wherein the single site catalyst is a metallocene.

34. The method of claim 32 wherein the second ethylene polymer that is blended is formed by the polymerization reaction with a metallocene catalyst system.

35. The method of claim 32 wherein the propylene polymer comprises polypropylene.

36. The method of claim 32 wherein the propylene polymer comprises a propylene copolymer.

37. The method of claim 32 wherein the propylene polymer is a copolymer of propylene and ethylene.

38. The method of claim 32 wherein the propylene polymer is an elastomeric terpolymer of ethylene and propylene.

39. The method of claim 32 wherein the second ethylene polymer is a copolymer of ethylene and an alpha olefin.

40. The method of claim 32 wherein the second ethylene polymer is an interpolymer of ethylene and a $C_3$–$C_{20}$ alpha olefin.

41. The method of claim 32 wherein the second ethylene polymer is an elastomeric terpolymer of ethylene and butene-1.

42. The method of claim 32 wherein the second ethylene polymer is a linear ethylene butene-1 copolymer.

43. The method of claim 32 wherein the propylene polymer is an elastomeric terpolymer of ethylene, propylene and a monomer capable of imparting elastomeric properties to the terpolymer, the second ethylene polymer is an ethylene butene-1 copolymer and the blend comprises about 10 to about 15 wt. % of the terpolymer and about 85 to about 90 wt. % of the ethylene butene-1 copolymer.

44. The method of claim 43 wherein the second ethylene polymer is a linear ethylene butene-1 copolymer.

45. The method of claim 32 wherein the first ethylene polymer comprises a low density polyethylene.

46. The method of claim 43 wherein the first ethylene polymer comprises a low density polyethylene.

47. The method of claim 44 wherein the first ethylene polymer comprises a low density polyethylene.

48. The method of claim 32 wherein the first polyethylene polymer comprises a high density polyethylene.

49. The method of claim 42 wherein the linear ethylene butene-1 copolymer has a melt index of about 3.5 to about 4.5 dg/min.

50. The method of claim 42 wherein the linear ethylene butene-1 copolymer has a density of about 0.900 to about 0.905 g/cm$^3$.

51. The method container of claim 44 wherein the terpolymer has a melt flow rate of about 0.9 dg/min, and a density of about 0.88 g/cm$^3$.

52. The method of claim 32 wherein the propylene polymer is a copolymer of propylene and ethylene and the copolymer comprises about 75 wt. % polypropylene and about 25 wt. % polyethylene based on the weight of the copolymer.

53. The method of claim 52 wherein the copolymer of propylene and ethylene has a density of about 0.899 to about 0.903 g/cm$^3$, and a melt flow rate of about 2 g/10 min.

54. The method of claim 53 wherein the second ethylene polymer is a copolymer of ethylene and an alpha olefin and comprises from about 20 to about 30 wt. %, and the copolymer of propylene and ethylene comprises about 70 to 80 wt. % of the blend.

55. The method of claim 54 wherein the copolymer of ethylene and an alpha olefin comprises an ethylene butene-1 copolymer, and the propylene polymer comprises a copolymer of propylene and ethylene comprising about 75 wt. % polypropylene and about 25 wt. % polyethylene, based on the weight of the propylene polymer.

56. The method of claim 55 wherein the copolymer of ethylene and an alpha olefin comprises a linear ethylene butene-1 copolymer.

57. The method of claim 55 or 56 wherein the copolymer of propylene and ethylene has a density of about 0.899 to about 0.903 g/cm$^3$, and a melt flow rate of about 2 g/10 min.

58. The method of claim 55 or 56 wherein the first ethylene polymer is comprised of low density polyethylene.

59. The method of claim 55 or 56 wherein the first ethylene polymer is comprised of high density polyethylene.

60. The method of claim 32 wherein the propylene polymer of the blend comprises about 70 to about 90 wt. % and the second ethylene polymer comprises about 10 to about 30 wt. % of the blend.

61. The method of claim 32 wherein the blend of the propylene polymer and the second ethylene polymer is used to form the head of a collapsible dispensing container, the head having an integral cap that is integrally joined to the head-by a living hinge.

62. The method of claim 32 wherein the second ethylene polymer comprises about 5 to about 49 wt. %, and the propylene polymer comprises about 51 to about 95 wt. % of the blend.

63. The method of claim 32 wherein the second ethylene polymer is a copolymer of ethylene and a linear alpha olefin and comprises about 25 to about 30 wt. %, and the propylene polymer is a copolymer of propylene and ethylene comprises about 75 to 80 wt. % of the blend.

64. The method of claim 63 wherein the copolymer of ethylene and a linear alpha olefin is a linear copolymer of ethylene and 1-butene, and said copolymer has a melt index of about 3.5 dg/min. and a density of about 0.900 g/cm$^3$.

65. The method of claim 32, wherein the head has an integral cap that is integrally joined to the head by a living hinge.

* * * * *